(12) United States Patent
Yano

(10) Patent No.: US 7,096,000 B2
(45) Date of Patent: Aug. 22, 2006

(54) HANDOFF METHOD FOR A COMMUNICATION SYSTEM OF A TRAIN

(75) Inventor: Yukiko Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 168 days.

(21) Appl. No.: 10/874,212

(22) Filed: Jun. 24, 2004

(65) Prior Publication Data

US 2004/0266444 A1 Dec. 30, 2004

(30) Foreign Application Priority Data

Jun. 30, 2003 (JP) ............................ 2003-188921

(51) Int. Cl.
*H04B 1/06* (2006.01)
*H04B 11/02* (2006.01)

(52) U.S. Cl. ...................... 455/345; 455/436; 455/439; 455/99; 455/33.2; 455/454; 455/446

(58) Field of Classification Search .................. 455/99, 455/33.2, 345, 446, 447, 454, 422.1
See application file for complete search history.

(56) References Cited

U.S. PATENT DOCUMENTS 5,673,307 A * 9/1997 Holland et al. ............. 455/436
5,970,408 A * 10/1999 Carlsson et al. ............ 455/439
6,345,186 B1 2/2002 Schultz et al.

FOREIGN PATENT DOCUMENTS

| EP | 0 933 898 | 8/1999 |
|----|-----------|--------|
| JP | 9-327057 | 12/1997 |
| JP | 10-164640 | 6/1998 |
| JP | 11-298967 | 10/1999 |

* cited by examiner

Primary Examiner—Lester G. Kincaid
Assistant Examiner—Dung Lam
(74) Attorney, Agent, or Firm—Young & Thompson

(57) ABSTRACT

In a mobile communication system, even when cells formed by fixed radio base stations are separated from each other, the switching operation between the cells is easily carried out to conduct continuous communication. A first-end radio device mounted in a first-end section of a mobile unit and linked with one of fixed radio base stations or a last-end radio device mounted in a last-end section of a mobile unit and linked with one of fixed radio base stations is selected. A communication network is established between the first-end or last-end radio device thus selected and a plurality of mobile terminals in the mobile unit. This makes it possible to construct a communicable zone (a virtual cell) on the mobile unit and hence elongates the ranges of cells formed by the base stations.

16 Claims, 18 Drawing Sheets

F I G. 6
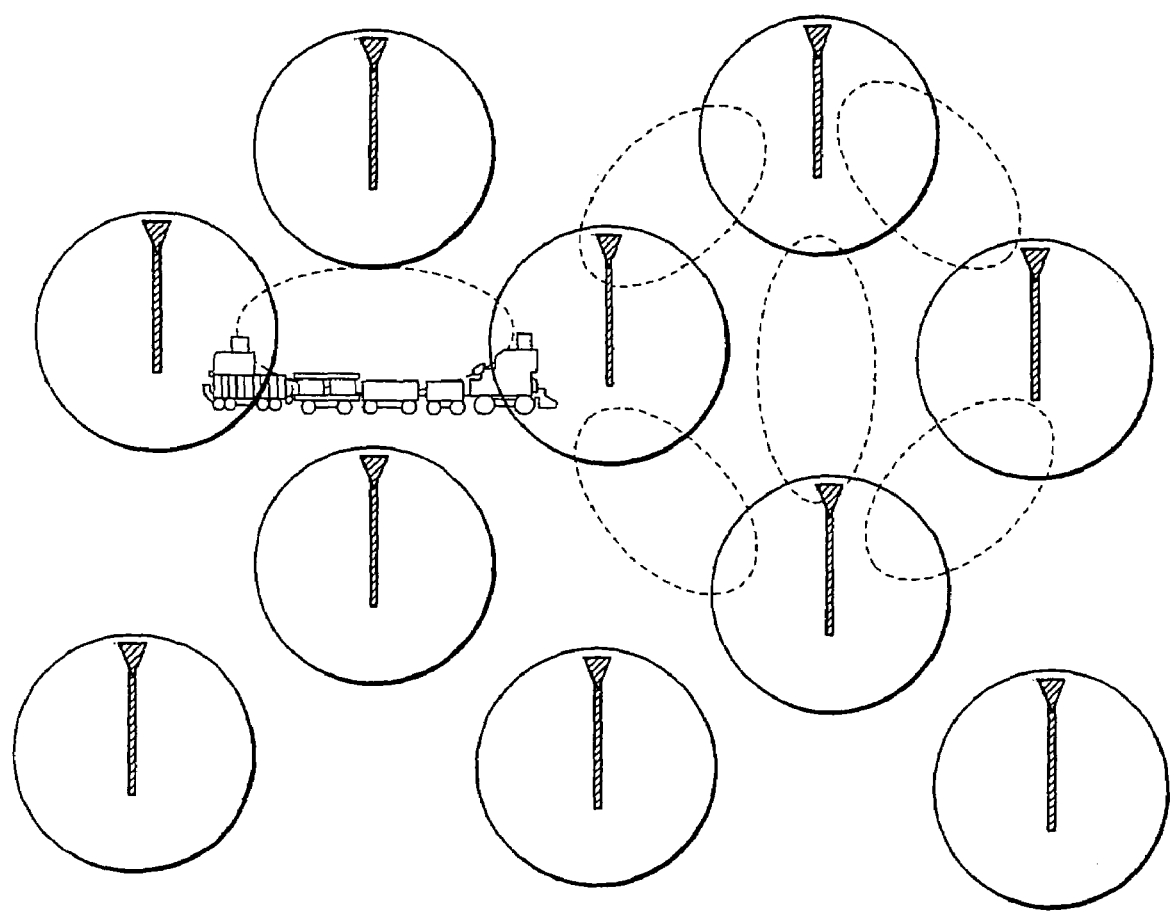

F I G. 16
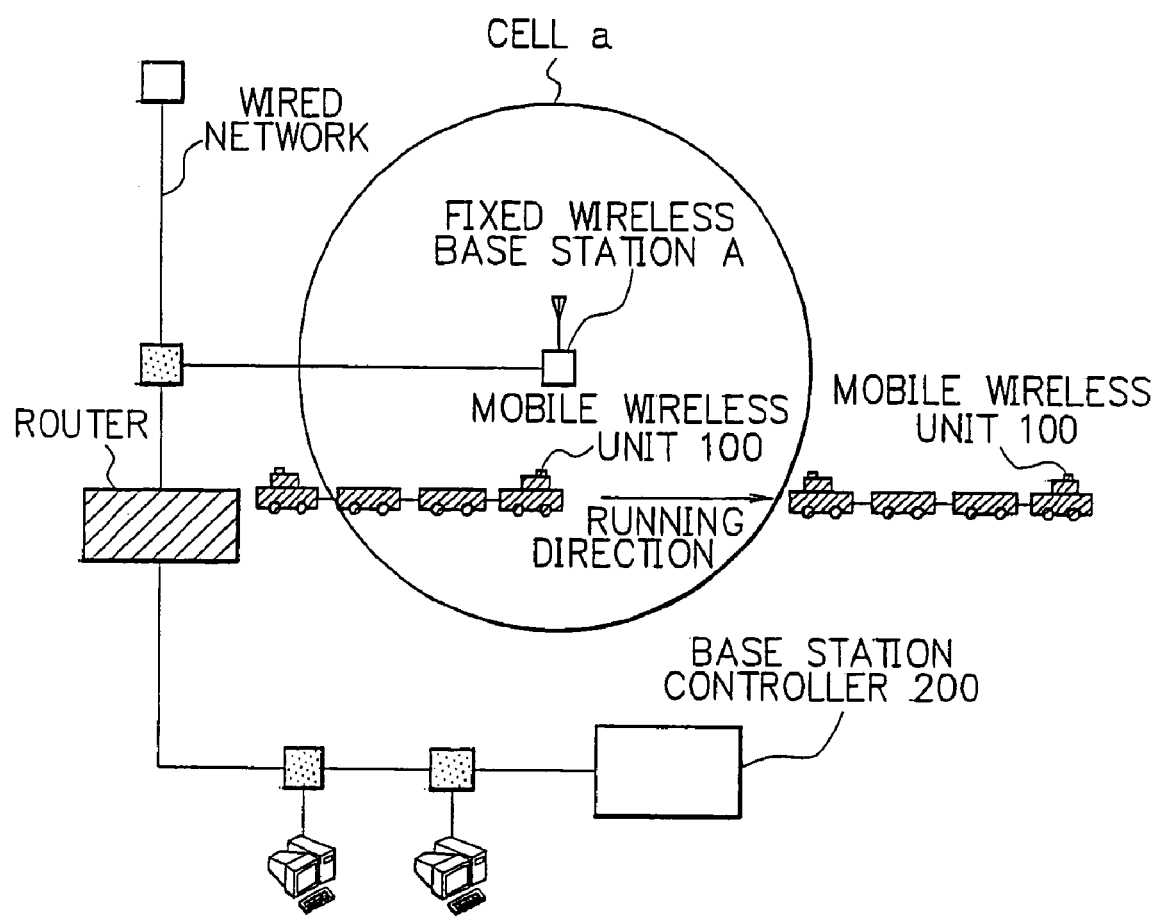
PRIOR ART

HANDOFF METHOD FOR A COMMUNICATION SYSTEM OF A TRAIN

BACKGROUND OF THE INVENTION

1. Field of the Invention

The present invention relates to a mobile communication system and a communication control method for use with the system including cells of which each defines a predetermined radio wave arrival range of radio waves from a fixed base station associated with the cell, and in particular, to a mobile communication system and a communication control method for use with the system suitable for a mobile unit or module such as a train moving at a high speed.

2. Description of the Prior Art

To guarantee wide uses of mobile communication terminal devices using radio or wireless communication, communication enterprises have been endeavoring to develop areas for the terminal devices. Recently, the areas have been broaden beyond indoor areas to include zones such as places in a subway train and a tunnel. The terminal device can be used in a moving train and even in a high-speed mobile unit such as a train of the Japanese rapid line or Shinkansen today. Therefore, it is expected that many people uses such communication terminals in a moving train. For this purpose, a type of network business is being developed using communication terminals in a moving train. At present, it has been desired to develop a system in which the terminal in a car moving at a high speed can continuously keep a communication line to a party of communication.

For example, Japanese Patent Laid-Open No. Hei 11-298967 filed before the present specification describes a technique in which a wireless mobile station which can be connected to a public communication line and/or a leased communication line to communicate with an outer-vehicle wireless base station disposed outside a vehicle and an inner-vehicle wireless base station to communicate with the mobile station and a wireless terminal device in a vehicle are arranged so that signals are transmitted from the vehicle to the outer-vehicle base station.

Moreover, Japanese Patent Laid-Open Ser. No. 09-327057 proposes a mobile communication system in which to enable communication in a running train by use of a mobile terminal device (PS) for a micro-cell system, there are disposed a plurality of inside wireless stations (CS) in a train for a micro-cell system to communicate with the mobile terminal so that a wireless base station (BS) disposed outside of the train is connected to the inside stations (CS).

Japanese Patent Laid-Open No. Hei-10-164640 describes a mobile communication system in which a communicating device to communicate with a mobile terminal in a mobile unit is arranged in a place of a first end thereof and in a place of a last end thereof. When the mobile unit moves from a first position to a second position, the communicating devices at the first and last ends of the mobile unit conduct a change-over operation with respect to an external fixed base station to continuously retain a linked state in which each of the communicating devices establishes a link with the fixed base station.

In the conventional cell configuration of the fixed wireless base stations, cells are adjacent to each other or overlap with each other to continuously use a communication line between a mobile wireless device and a fixed wireless station.

As can be seen from FIG. 16, for example, when a mobile wireless device 100 in a linked state for a fixed wireless base station A, namely, in a state capable of communicating with the base station A moves in a running direction to a position outside a cell a configured by the base station A, the device 100 enters a non-linked or disconnected state for the base station A, i.e., a state in which the device 100 cannot communicate with the base station A. That is, the link between the wireless device 100 and the base station A is disconnected and hence communication is not possible therebetween. To continuously keep the communication of the wireless device 100 in this situation, the system is configured so that the cell a of the base station A is contiguous to a cell b constructed by a fixed wireless base station B or the cell a overlaps with the cell b as shown in FIG. 17. Thanks to this configuration, the link between the mobile device 100 and the base station A is released and a new link is prepared between the device 100 and the base station B in the situation described above. As a result, the communication line being used by the wireless terminal device 100 is kept connected.

However, as can be seen from FIG. 17 showing the cell configuration of the prior art, the cells (a and b) are adjacent to each other or overlap with each other in consideration of each size of a radio signal receivable range of each fixed wireless base station and a distance between the base stations. That is, the cells are configured only according to the fixed base stations. To reduce the number of base stations in this case, it is favorable to separate the cells (a and b) from each other as shown in FIG. 18. However, in accordance with Japanese Patent Laid-Open Nos. Hei-11-298967 and Hei-09-327057, when the cells (a and b) are apart from each other, a non-communicable zone in which communication is not possible between a fixed wireless base station and the mobile wireless device appears between the cells a and b. As a result, the mobile wireless device 100 cannot continuously conduct communication.

In the technique described in Japanese Patent Laid-Open No. Hei-10-164640, even when the cells (a and b) are separated from each other as shown in FIG. 18, it can be considered that the first and second mobile communication units become alternately linked with fixed wireless base stations to continuously conduct communication. However, as implied by FIGS. 1 to 5, the technique has an object in which the first and second mobile communication units are alternately set to the linked state, namely, either one there of is in the communicable state to continuously carry out communication when the cells overlap with each other. When either one of the mobile communication units enters a linked state, a switching section releases the linked state of the other one thereof into a non-linked state so that only one of the communication units is in the linked state. This complicates control processing of the switching section and hence there exits a fear of delay in the switching operation to establish a linked state in the mobile communication unit.

SUMMARY OF THE INVENTION

It is therefore an object of the present invention, which has been devised to remove the problems, to provide a mobile communication system and a communication control method for use with the system in which even when the cells configured by fixed wireless base stations are apart from each other, the switching operation can be simply accomplished between the cells for mobile communication units to continuously conduct communication.

To achieve the object in accordance with the present invention, there is provided a mobile communication system including a plurality of fixed radio base stations each of which configures a predetermined wave arrival range and establishes a linked state with a radio device within the wave arrival range to conduct radio communication with the radio device, and a mobile unit with at least two modules of the radio devices mounted at positions of the mobile unit to be in a wave arrival range of any one of the base stations, the unit including a communication control unit for controlling the radio devices on the mobile unit. The base stations are disposed at positions at which the base stations form wave arrival ranges not overlapping with each other. The communication control unit includes a radio device connecting module for establishing a communication network between a plurality of mobile terminals in the mobile unit and at least one radio device selected from a first-end radio device mounted in a first-end section of the mobile unit and linked in a linked state with one of the base stations and a last-end radio device mounted in a last-end section of the mobile unit and linked in a linked state with one of the base stations. The radio device connecting module establishes a communication network between the first-end radio device and the mobile terminals at occurrence of an event in which the linked state of the first-end radio device with a first fixed radio base station is once released and then a linked state of the first-end radio device with a second fixed radio base station is established. The radio device connecting module establishes a communication network between the last-end radio device and the mobile terminals at occurrence of an event in which the linked state of the last-end radio device with the first fixed radio base station is once released and then a linked state of the last-end radio device with the second fixed radio base station is established.

In the mobile communication system, the communication control unit includes a radio wave control module for comparing a value of a radio wave level received by the first-end radio device from the base station associated therewith with a value of a radio wave level received by the last-end radio device from the base station associated therewith. The radio device connecting module establishes a communication network between the mobile terminals in the mobile unit and one of the radio devices having a higher value of the radio wave level determined as a result of the comparison by the radio wave control module.

In the mobile communication system, the radio wave control module compares, when a radio wave received by the first-end radio device from the base station associated therewith is transmitted from the first-end radio device or when a radio wave received by the last-end radio device from the base station associated therewith is transmitted from the last-end radio device, values of radio wave levels of the radio waves with each other, and establishes a communication network between the mobile terminals in the mobile unit and one of the radio devices having a higher value of the radio wave level determined as a result of the comparison by the radio wave control module.

In the mobile communication system, the first-end radio device measures therein a value of a level of a radio wave received by the first-end radio device from the base station associated therewith and the last-end radio device measures therein a value of a level of a radio wave received by the last-end radio device from the base station associated therewith. The radio wave control module compares, when the values resultant from measurement by the respective radio devices are transmitted therefrom, the values with each other and then establishes a communication network between the mobile terminals in the mobile unit and one of the radio devices having a higher value of the radio wave level determined as a result of the comparison by the radio wave control module.

In the mobile communication system, the communication control unit includes a positional information measuring module for measuring a central position of the mobile unit while the mobile unit is moving, a positional information storage module for storing installation positions respectively of the fixed radio base stations, and a positional information retrieval module for retrieving from the positional information storage means an installation position of one of the base stations according to the central position of the mobile unit measured by the positional information measuring module, the installation position being most associated with the central position. The radio device connecting module establishes a communication network between the first-end radio device and the mobile terminals when it is determined that the installation position of the base station retrieved by the positional information retrieval module is at a forward position of the mobile unit. The radio device connecting module establishes a communication network between the last-end radio device and the mobile terminals when it is determined that the installation position of the base station retrieved by the positional information retrieval module is at a backward position of the mobile unit.

In the mobile communication system, the communication control unit includes a passage time calculating module for obtaining a period of incoming time from when the first-end radio device enters a radio wave arrival range formed by the base station associated therewith to when a central radio device disposed at a central position of the mobile unit enters the radio wave arrival range and a period of outgoing time from when the first-end radio device leaves the radio wave arrival range formed by the base station to when the central radio device leaves the radio wave arrival range. The radio device connecting module establishes a communication network between the last-end radio device and the mobile terminals by predicting, on the basis of the period of incoming time obtained by the passage time calculating module, a period of time from when the central radio device enters the radio wave arrival range to when the last-end radio device enters the radio wave arrival range. The radio device connecting module establishes a communication network between the first-end radio device and the mobile terminals by predicting, on the basis of the period of outgoing time obtained by the passage time calculating module, a period of time from when the central radio device leaves the radio wave arrival range to when the last-end radio device leaves the radio wave arrival range.

In the mobile communication system, the radio device connecting module establishes a communication network between the last-end radio device and the mobile terminals and a communication network between the first-end radio device and the mobile terminals when the last-end radio device is in the linked state with the first base station and the last-end radio device is in the linked state with the second base station.

In the mobile communication system, the communication control unit includes a communication data distributor module for making, when the radio device connecting module establishes a communication network between the last-end radio device and the mobile terminals and a communication network between the first-end radio device and the mobile terminals, a check to determine whether data is transmitted to the first-end radio device or the last-end radio device and sends a data packet to the first-end or last-end radio device determined as a result of the check.

In accordance with the present invention, there is provided a communication control method for use with a mobile communication system comprising a plurality of fixed radio base stations each of which configures a predetermined wave arrival range and establishes a linked state with a radio device within the wave arrival range to conduct radio communication with the radio device and a mobile unit with at least two modules of the radio devices mounted at positions of the mobile unit to be in a wave arrival range of any one of the base stations, the unit including communication control unit for controlling the radio devices on the mobile unit, the communication control unit including a radio device connecting module for establishing a communication network between a plurality of mobile terminals in the mobile unit and at least one radio device selected from a first-end radio device mounted in a first-end section of the mobile unit and linked in a linked state with one of the base stations and a last-end radio device mounted in a last-end section of the mobile unit and linked in a linked state with one of the base stations. The method includes the steps of selecting by the radio device connecting module, when the radio device connecting module senses occurrence of an event in which the linked state of the first-end radio device with a first fixed radio base station is once released and then a linked state of the first-end radio device with a second fixed radio base station is established, the first-end radio device and establishing a communication network between the first-end radio device and the mobile terminals, and selecting by the radio device connecting module, when the radio device connecting module senses occurrence of an event in which the linked state of the last-end radio device with the first fixed radio base station is once released and then a linked state of the last-end radio device with the second fixed radio base station is established, the last-end radio device and establishing a communication network between the last-end radio device and the mobile terminals.

In the communication control method, the communication control unit further includes a radio wave control module for comparing a value of a radio wave level received by the first-end radio device from the base station associated therewith with a value of a radio wave level received by the last-end radio device from the base station associated therewith. The method further includes the steps of comparing by the radio wave control module a value of a radio wave level received by the first-end radio device from the base station associated therewith with a value of a radio wave level received by the last-end radio device from the base station associated therewith, and establishing by the radio device connecting module a communication network between the mobile terminals in the mobile unit and one of the radio devices having a higher value of the radio wave level determined as a result of the comparison by the radio wave control module.

The communication control method further includes the steps of comparing by the radio wave control module, when a radio wave received by the first-end radio device from the base station associated therewith is transmitted from the first-end radio device or when a radio wave received by the last-end radio device from the base station associated therewith is transmitted from the last-end radio device, values of radio wave levels of the radio waves with each other, and establishing by the radio device connecting module a communication network between the mobile terminals in the mobile unit and one of the radio devices having a higher value of the radio wave level determined as a result of the comparison by the radio wave control module.

The communication control method further includes the steps of measuring by the first-end radio device a value of a level of a radio wave received from the base station associated therewith and transmitting the value to the radio wave control module, measuring by the last-end radio device a value of a level of a radio wave received from the base station associated therewith and transmitting the value to the radio wave control module, comparing by the radio wave control module, when the values resultant from measurement by the respective radio devices are transmitted therefrom, the values with each other, and establishing the radio device connecting module a communication network between the mobile terminals in the mobile unit and one of the radio devices having a higher value of the radio wave level determined as a result of the comparison by the radio wave control module.

In the communication control method, the communication control unit further includes a positional information measuring module for measuring a central position of the mobile unit while the mobile unit is moving, a positional information storage module for storing installation positions respectively of the fixed radio base stations, and a positional information retrieval module for retrieving from the positional information storage module an installation position of one of the base stations according to the central position of the mobile unit measured by the positional information measuring module, the installation position being most associated with the central position. The method further includes the steps of measuring by the positional information measuring module a central position of the mobile unit while the mobile unit is moving, and transmitting the central position to the positional information retrieval module; retrieving, by the positional information retrieval module, from the positional information storage module an installation position of one of the base stations according to the central position of the mobile unit measured by the positional information measuring module, the installation position being most associated with the central position, and delivering the installation position to the radio device connecting module; and establishing by the radio device connecting module a communication network between the first-end radio device and the mobile terminals when it is determined that the installation position of the base station retrieved by the positional information retrieval module is at a forward position of the mobile unit, and establishing a communication network between the last-end radio device and the mobile terminals when it is determined that the installation position of the base station retrieved by the positional information retrieval module is at a backward position of the mobile unit.

In the communication control method, the communication control unit further includes a passage time calculating module for obtaining a period of incoming time from when the first-end radio device enters a radio wave arrival range formed by the base station associated therewith to when a central radio device disposed at a central position of the mobile unit enters the radio wave arrival range and a period of outgoing time from when the first-end radio device leaves the radio wave arrival range formed by the base station to when the central radio device leaves the radio wave arrival range. The method further includes the steps of obtaining by the passage time calculating module the period of incoming time from when the first-end radio device enters a radio wave arrival range formed by the base station associated therewith to when a central radio device disposed at a central position of the mobile unit enters the radio wave arrival range, and transmitting the period of incoming time to the radio device connecting module; establishing by the radio device connecting module a communication network between the last-end radio device and the mobile terminals by predicting, on the basis of the period of incoming time obtained by the passage time calculating module, a period of time from when the central radio device enters the radio wave arrival range to when the last-end radio device enters the radio wave arrival range; obtaining by the passage time calculating module the period of outgoing time from when the first-end radio device leaves the radio wave arrival range formed by the base station to when the central radio device leaves the radio wave arrival range, and transmitting the period o outgoing time to the radio device connecting module; and establishing by the radio device connecting module a communication network between the first-end radio device and the mobile terminals by predicting, on the basis of the period of outgoing time obtained by the passage time calculating module, a period of time from when the central radio device leaves the radio wave arrival range to when the last-end radio device leaves the radio wave arrival range.

The communication control method further includes the step of establishing by the radio device connecting module a communication network between the last-end radio device and the mobile terminals and a communication network between the first-end radio device and the mobile terminals when the last-end radio device is in the linked state with the first base station and the last-end radio device is in the linked state with the second base station.

In the communication control method, the communication control unit further includes a communication data distributor module for making a check to determine whether data is transmitted to the first-end radio device or the last-end radio device and sends a data packet to the first-end or last-end radio device determined as a result of the check. The method further includes the steps of making a check by the communication data distributor module, when the radio device connecting module establishes a communication network between the last-end radio device and the mobile terminals and a communication network between the first-end radio device and the mobile terminals, to determine whether data is transmitted to the first-end radio device or the last-end radio device and sending a data packet to the first-end or last-end radio device determined as a result of the check.

BRIEF DESCRIPTION OF THE DRAWINGS

The objects and features of the present invention will become more apparent from the consideration of the following detailed description taken in conjunction with the accompanying drawings in which:

FIG. 6 is a schematic diagram showing an image of a state of contiguous cells by removing non-communicable zones between the cells of fixed radio base stations by using the first-end wireless device and the last-end wireless device mounted on the mobile unit;

FIG. 16 is a diagram showing operation of a wireless device mounted on a mobile unit in a conventional mobile communication system;

DESCRIPTION OF THE EMBODIMENTS

Referring next to the accompanying drawings, description will be given of an embodiment of a mobile communication system in accordance with the present invention.

First Embodiment

Figure 1:
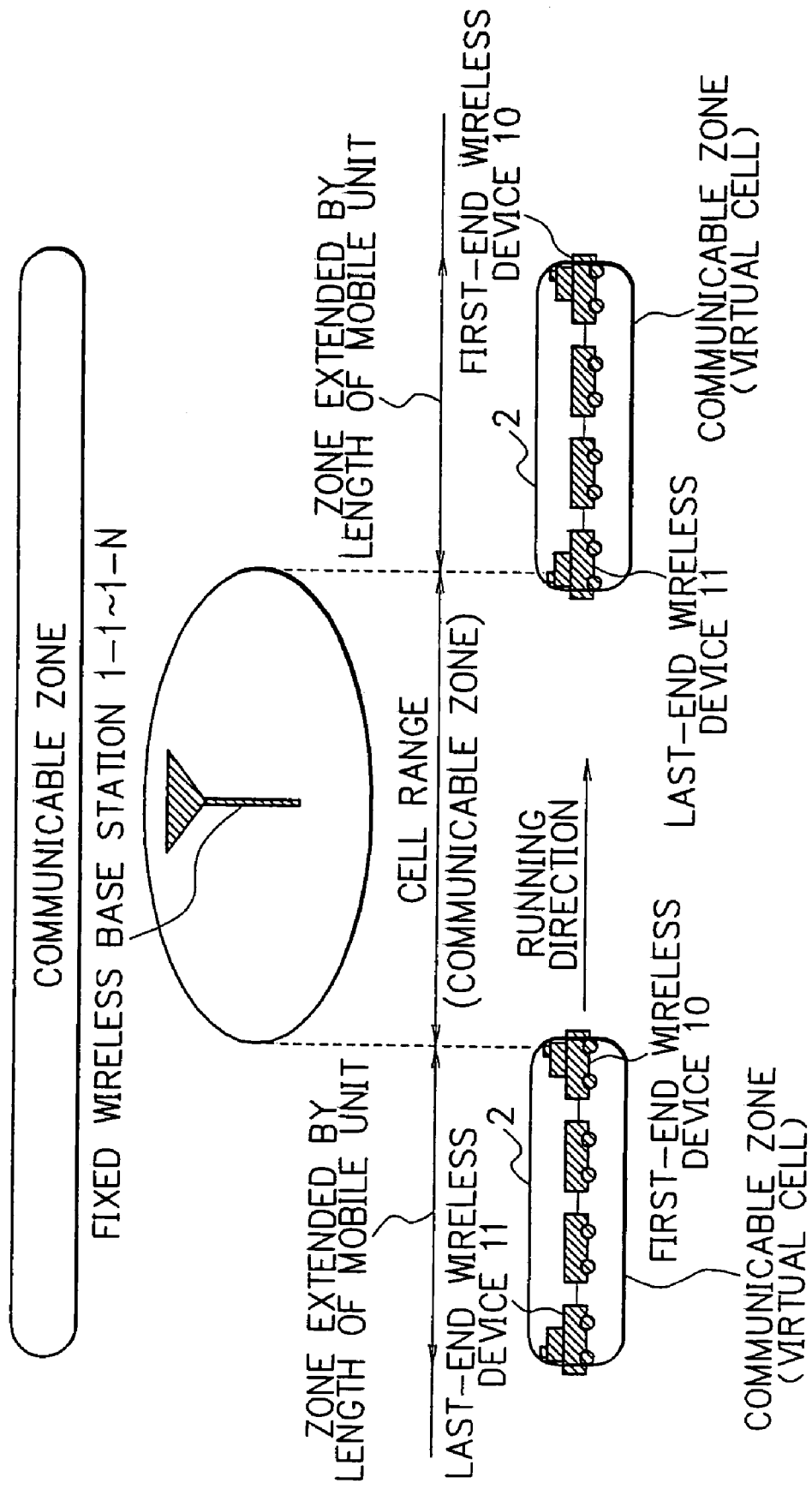
FIG. 1 is a schematic diagram showing an outline of a first embodiment of a mobile communication system in accordance with the present invention.

Description will now be given of a first embodiment of a mobile communication system by referring to FIG. 1.

The system includes fixed radio base stations 1-1 to 1-N (N is an integer more than one) and a mobile unit 2. The unit 2 includes wireless device 10 and 11 to conduct wireless or radio communication with the base stations 1-1 to 1-N.

The base stations 1-1 to 1-N configure respective cells as ranges of arrival of a particular radio wave and communicate signals with the wireless devices 10 and 11 of the mobile unit 2 existing in such a cell. When the mobile unit 2 moves to a position in a cell configured by one of the base stations 1-1 to 1-N, a link is set between the wireless devices 10 and 11 and the pertinent base station to conduct communication therebetween.

The mobile unit 2 is, for example, a mobile unit having a predetermined length such as a train and moves between the cells of the base stations 1-1 to 1-N. In the embodiment, a radio device, i.e., a first-end radio unit 10 is disposed in a first-end section of the mobile unit 2 and a radio device, i.e., a last-end radio unit 11 is arranged in a last-end section of the unit 2 to communicate data with the base stations 1-1 to 1-N. The first-end and last-end radio units 10 and 11 alternately establish a link with one of the base stations 1-1 to 1-N to form a zone in which communication can be successively conducted. The configuration of the mobile unit 2 will now be described in detail by referring to FIG. 2.

The wireless devices 10 and 11 are connected to a communication controller 20 controlling a communication network in the mobile unit 2. Each car of the train of the mobile unit 2 includes an inside communication unit 30. When the controller 20 selects either one of wireless devices 10 and 11, the selected device conducts communication via the inside communication unit 30 with a mobile radio unit 40 disposed in the car. The unit 30 is a device to establish a communication network with the mobile radio unit 40 in the mobile unit 2.

In the embodiment of a mobile communication system, a network is established between the base stations 1-1 to 1-N and the mobile wireless devices 40 via the radio devices 10 and 11 and the inside communication device 30.

The communication controller 20 of the first embodiment includes a communication path selecting section 21 and a communication processing section 22 to control a communication network between the inside communication unit 30 and the first-end radio unit 10 or the last-end radio unit 10. Description will next be given of functions of the controller 20 of the first embodiment.

The communication path selector 21 selects connection between the wireless devices 10 and the communication processor 22 or between the wireless devices 11 and communication processor 22 to change a communication network to the mobile unit 2. When the wireless device 10 or 11 is disconnected from one of the base stations 1-1 to 1-N or is connected thereto, the wireless device 10 or 11 notifies the condition to the selector 21. Then, the selector 21 accomplishes the switching operation as described above.

The communication processor 22 connects the communication network selected and set by the path selector 21 to the inside communication unit 30 of each car of the mobile unit 2. Resultantly, the processor 22 configures a communication network from the mobile radio unit 40 of each car via the inside communication unit 30 to the wireless device 10 or a communication network between the mobile radio unit 40 and the wireless device 11.

Figure 3:
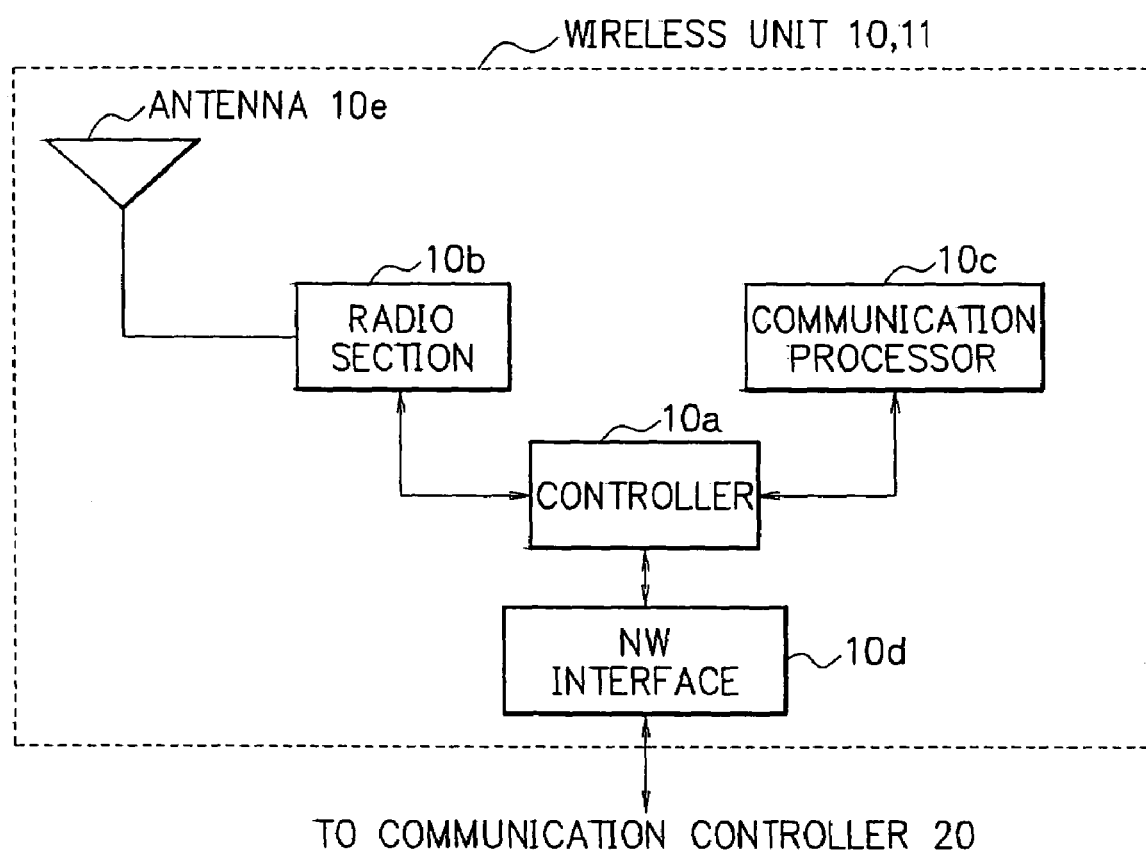
FIG. 3 is a block diagram schematically showing a construction of a wireless terminal device mounted on a mobile unit in a mobile communication system.

Referring next to FIG. 3, description will be given of an internal configuration of the first-end and last-end wireless communication modules 10 and 11.

Each of the wireless units 10 and 11 includes a controller 10a, a radio section 10b, a communication processing section 10c, a network interface (NW I/F) section 10d, and an antenna 10e. When the wireless unit 10 or 11 is connected to the communication controller 20, a network is constructed in the mobile unit 2. Description will no be given of functions of the constituent components of the unit 10 or 11.

The controller 10a controls overall operation in the wireless unit.

The wireless section 10b transmits data signals from the base stations 1-1 to 1-N disposed outside the mobile unit via the antenna 10e to the communication processor 10c. The section 10b also delivers a data signal sent from the communication processor 10c via the antenna 10e to the associated base station.

The communication processor 10c feeds data signals of the base station from the wireless section 10b via the interface 10d to the communication controller 20. The communication section 10c also transmits a data signal from the controller 20 via the interface 10d to the radio section 10b.

The network interface 10d delivers a data signal from the communication processor 10c to the communication controller 20. The interface 10d also feeds a data signal from the controller 20 to the communication processor 10c.

The first embodiment includes the first-end wireless device 10 in the first-end section of the mobile unit 2 and the last-end wireless device 11 in the last-end section of the mobile unit 2. The present invention is not restricted by the embodiment. It is also possible to configure a mobile unit 2 in which the radio units 10 and 11 are respectively disposed at least in the first-end and the last-end sections of the unit 2.

Operation of Wireless Units and Fixed Wireless Base Stations in Mobile Unit

Figure 2:
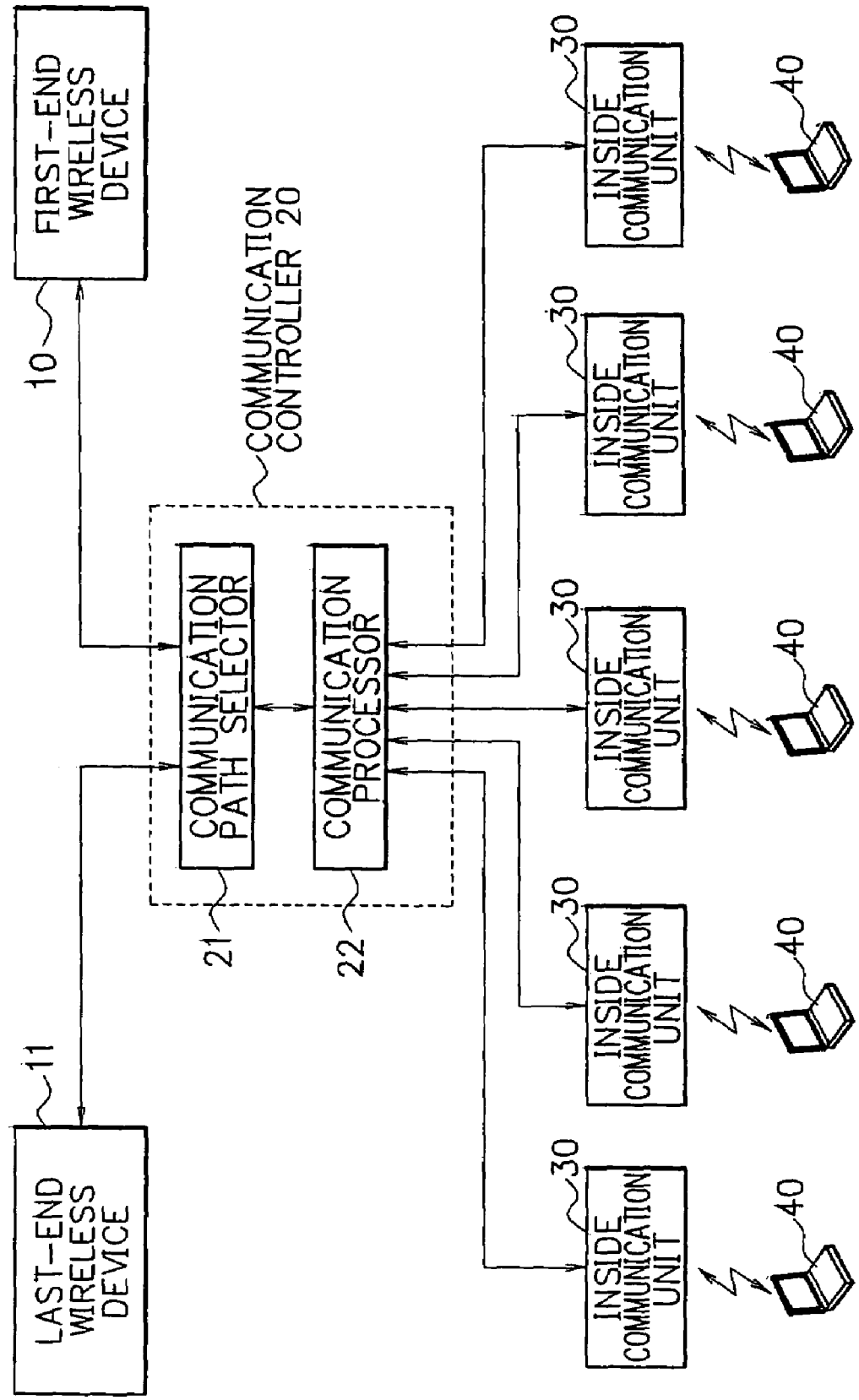
FIG. 2 is a block diagram showing a configuration of the first embodiment of a mobile communication system in accordance with the present invention.
Figure 4:
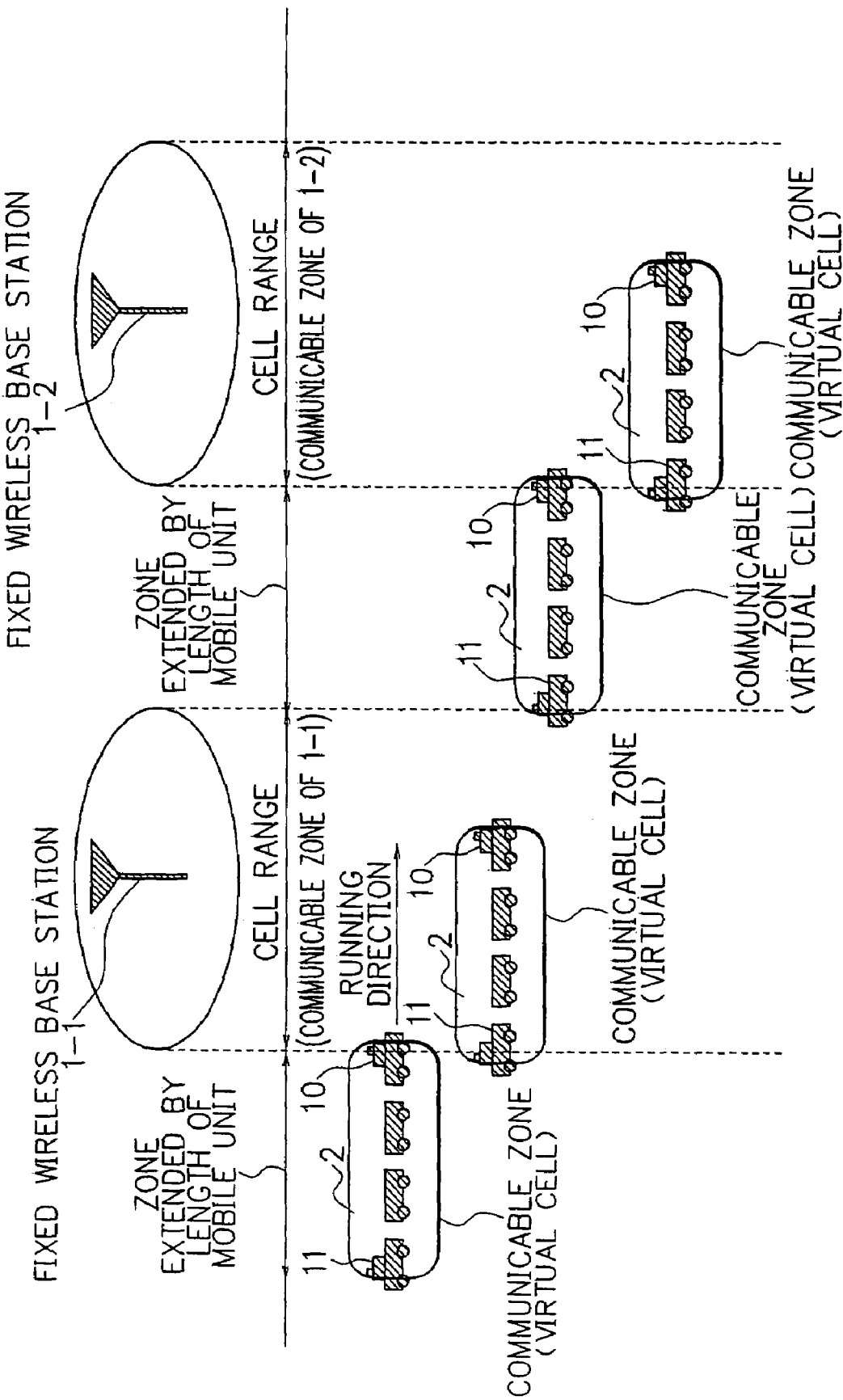
FIG. 4 is a schematic diagram showing communicable ranges, i.e., virtual cells formed when a mobile unit moves between fixed wireless base stations in the first embodiment of a mobile communication system.

Referring now to FIGS. 2 and 4, description will be given of operation and processing of the radio units 10 and 11 and the fixed base stations 1-1 to 1-N.

As can be seen from FIG. 4, when the radio device 10 on the mobile unit 2 enters a cell formed by the first base station 1-1, the device 10 is linked with the base station 1-1. The path selecting section 21 of the communication controller 20 connects the radio device 10 to the communication processor 22 to set a linked state between the radio device 10 and the first base station 1-1 in the mobile unit 2. As a result, the mobile radio device 40 in the mobile unit 2 can communicate data with the base station 1-1 via the inside communication unit 30 in the train connected to the radio device 10.

Subsequently, when the mobile unit 2 travels and the radio device 11 thereon enters a cell configured by the base station 1-1, the device 11 is set to a linked state with respect to the base station 1-1. Resultantly, the radio devices 10 and 11 are linked with the base station 1-1. The path selector 21 of the controller 20 selects the linked state between the radio device 11 and the communication processor 22 and does not select the linked state between the radio device 10 and the processor 22. This forms only the linked state between the radio device 11 and the base station 1-1 in the mobile unit 2. Therefore, the mobile radio device 40 in the mobile unit 2 can conduct data communication with the base station 1-1 via the inside communication unit 30 in the train connected to the radio device 11.

Thereafter, the mobile unit 2 further travels and leaves the cell of the base station 1-1 in the linked state with respect to the first-end radio device 10 on the mobile unit 2. The selector 21 of the controller 20 senses the event that the device 10 has left the cell of the base station 1-1. The selector 21 recognizes that the device 10 is going to enter a cell formed by the second base station 1-2 and prepares for a change to the connection between the device 10 and the communication processor 22. When the mobile unit 2 proceeds in the running direction and the first-end radio device 10 thereof enters a cell of the second base station 1-2, the device 10 is linked with the base station 1-2. In this situation, the selector 21 of the controller 20 changes the selection from the linked state between the radio device 11 and the communication processor 22 to that between the radio device 10 and the communication processor 22 to set only the linked state between the radio device 11 and the base station 1-2. Consequently, the mobile wireless module 40 in the mobile unit 2 can communicate data with the second base station 1-2 via the inside communication unit 30 in the train connected to the radio device 10.

The moving unit 2 advances and the last-end radio device 11 thereon leaves the cell of the first base station 1-1 linked with the radio device 11. Then, the selector 21 of the controller 20 detects the condition that the device 10 is out of the cell of the base station 1-1. The selector 21 recognizes that the device 10 is about to enter a cell of the second base station 1-2 and makes preparations for a change to the connection between the last-end wireless device 11 and the communication processor 22. When the mobile unit 2 further travels and the last-end radio device 11 thereon enters a cell of the second base station 1-2, the device 11 is set to the linked state with the base station 1-2. The wireless devices 10 and 11 are linked with the base station 1-2 in this case. The path selector 21 of the communication controller 20 conducts a change-over operation from the connection between the radio device 10 and the communication processor 22 to that between the radio device 11 and the communication processor 22. This resultantly establishes only the linked state between the radio device 11 and the first-end base station 1-1. Therefore, the wireless module 40 in the mobile unit 2 can conduct data communication with the second base station 1-2 via the inside communication unit 30 in the train coupled with the last-end radio device 11.

As above, the communication path selector 21 alternately selects the connection between the communication processor 22 and first-end wireless device 10 linked with the base station associated therewith and that between the communication processor 22 and the last-end wireless device 11 linked with the base stations associated therewith. This consequent makes it possible for the mobile radio device 40 in the mobile unit 2 to communicate data with the pertinent base station.

Figure 5:
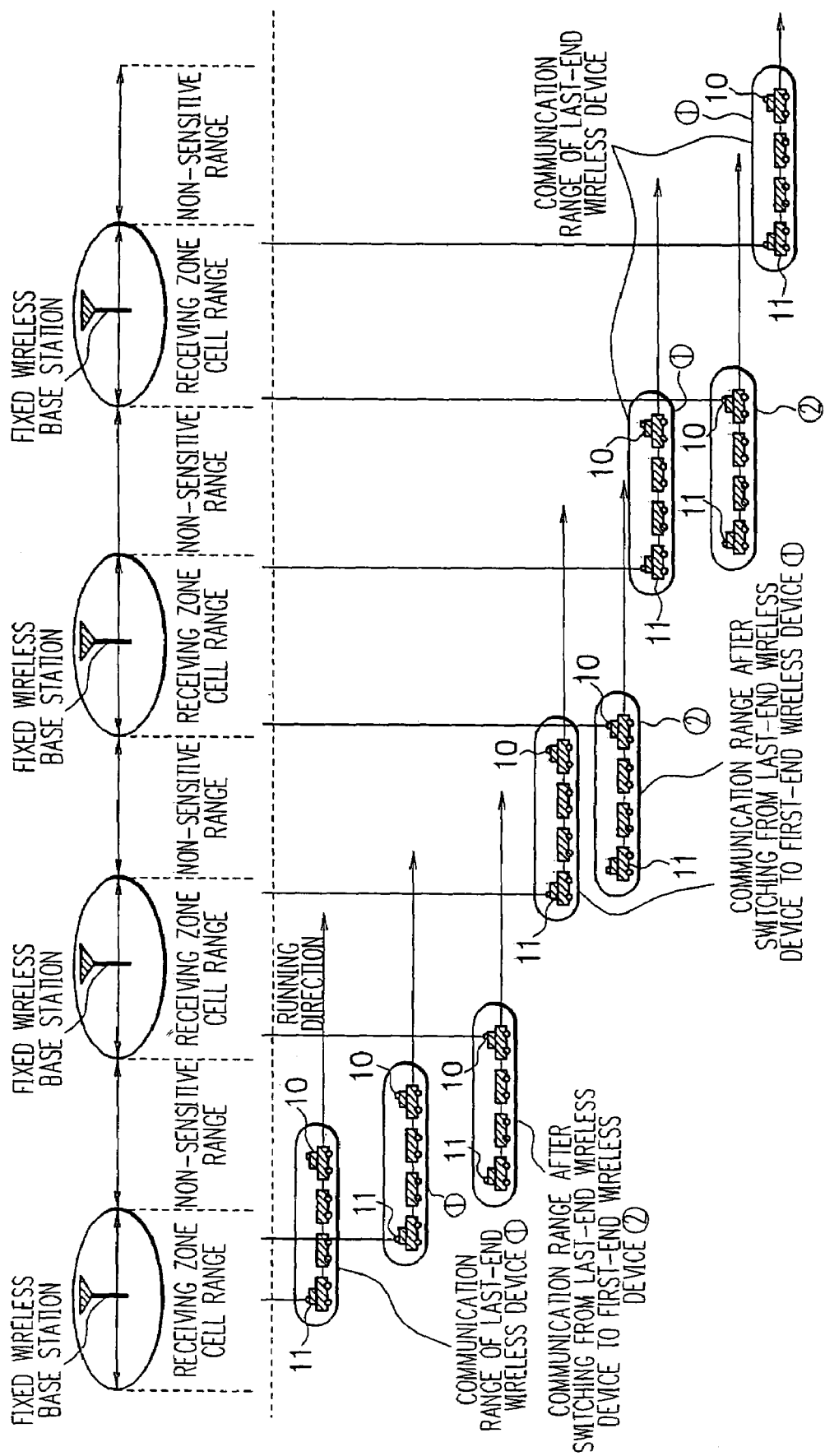
FIG. 5 is a diagram illustratively showing communicable ranges formed on a mobile unit when a first-end wireless device and a last-end wireless device on the mobile unit are alternately set to a linked state and a non-linked state in the first embodiment.

Even if the fixed radio base stations 1-1 to 1-N configure cells separated from each other as shown in FIG. 5, the path selector 21 alternately selects the wireless devices 10 and 11 in the linked state on the mobile unit 2 (① to ②, ② to ①) and hence the communicable range between the mobile unit 2 and the base stations 1-1 to 1-N can be extended by the length between the wireless devices 10 and 11. Therefore, as shown in FIG. 6, a non-sensitive zone (in which no link can be established between the mobile wireless device 40 and the base stations 1-1 to 1-N) appearing between the cells of the base stations can be supported by a virtual cell formed by the mobile unit 2, the virtual cell having the length of the mobile unit 2, specifically, that between the wireless devices 10 and 11. It is consequently possible to elongate the interval between the base stations 1-1 to 1-N, and hence the number thereof can be advantageously reduced. When the first-end or last-end radio device 10 or 11 is set to the linked state or is released therefrom, the device 10 or 11 notifies the condition to the path selector 21 of the communication controller 20 in the mobile unit 2. Therefore, the selector 21 can easily recognize the linked state of the device 10 or 11 to readily conduct the change-over operation between the connection between the radio device 10 in the linked state and the communication processor 22 and that between the radio device 11 in the linked state and the communication processor 22.

Second Embodiment

Next, description will be given of a second embodiment in accordance with the present invention.

Figure 7:
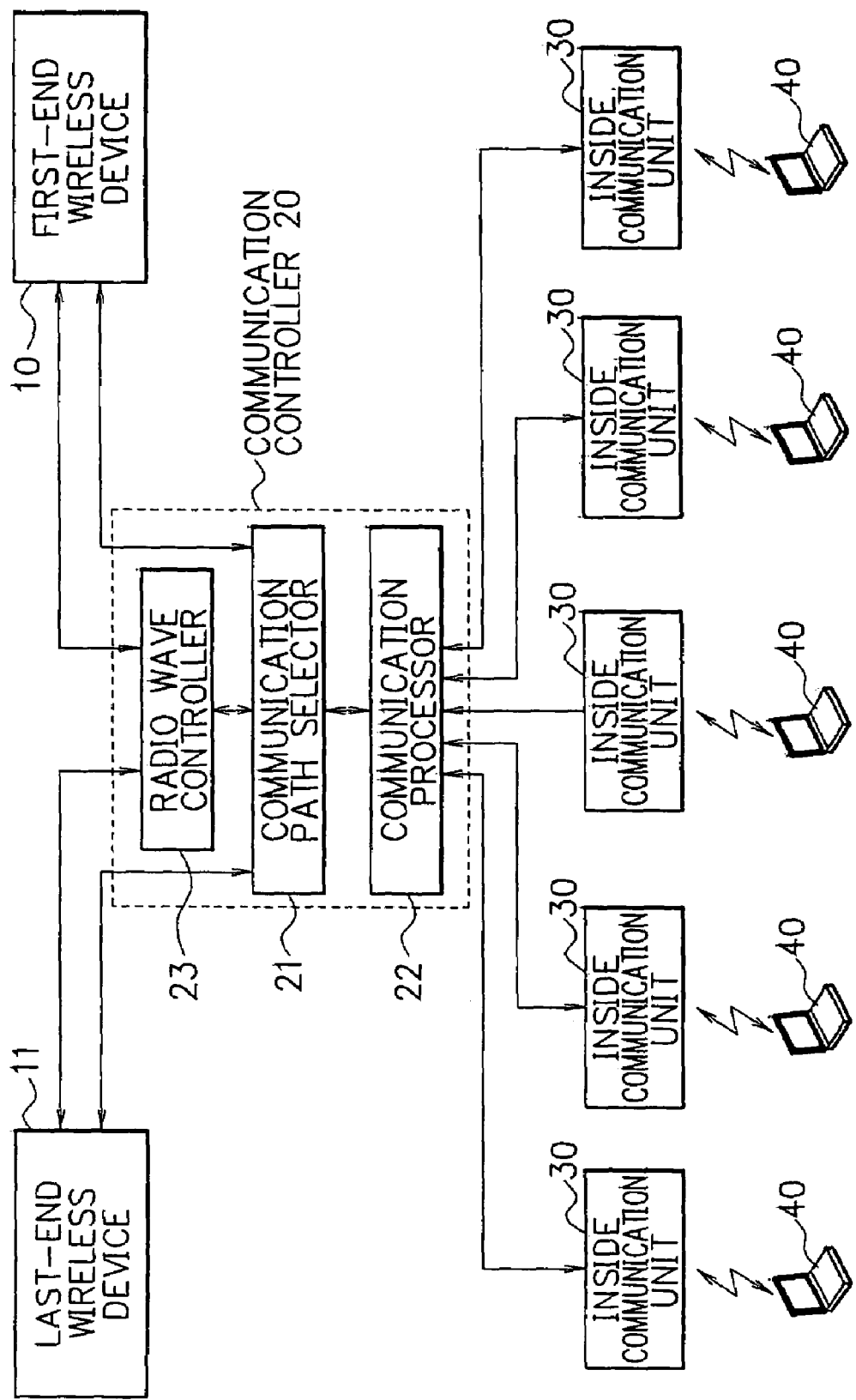
FIG. 7 is a block diagram showing a construction of a second embodiment of the mobile communication system.

The second embodiment differs from the first embodiment as below. In the operation to set the linked state between the radio device 10 and one of the base stations 1-1 to 1-N or that between the radio device 11 and one of the base stations 1-1 to 1-N in the mobile unit 2, a radio wave level received by the device 10 from the base station linked with the device 10 is compared with a radio wave level received by the device 11 from the base station linked therewith. As a result, the system sets the linked state in the mobile unit 2 for the radio device 10 or 11 with a higher radio wave level. Referring next to FIG. 7, description will be given of the second embodiment of a mobile communication system.

In the second embodiment, the communication controller 20 connected to the first-end and last-end wireless devices 10 and 11 includes a radio wave controller 23 to control the radio wave level received by the device 10 from the base station associated therewith and that received by the device 11 from the base station related thereto. The controller 23 compares the values of the radio wave levels with each other to establish a link for the device 10 or 11 higher in the radio wave level.

The radio wave controller 23 sets the linked state for the device 10 or 11 having a higher radio wave level by comparing the radio wave level between the devices 10 and 11 as described above. Therefore, the mobile wireless device 40 in the mobile unit 2 can conduct data communication with the associated base station via the inside communication module 30 in the train coupled with the radio device 10 or 11 in a better communication state.

In the second embodiment, it is also possible that when the radio wave received by the first-end or last-end radio device 10 or 11 from the base station associated therewith is delivered to the communication controller 20, the radio wave controller 23 of the communication controller 20 compares the values of the radio wave levels with each other to establish the linked state for the radio device 10 or 11 having a higher radio wave level. It is also possible that the radio devices 10 and 11 measure the radio wave levels respectively received from the base stations related thereto to feed results of the measurement to the communication controller 20. Using the resultant values received by the controller 20, the radio wave controller 23 makes a check to set the linked state for the radio device 10 or 11 having a higher wave level value.

Third Embodiment

Next, description will be given of a third embodiment in accordance with the present invention.

Figure 8:
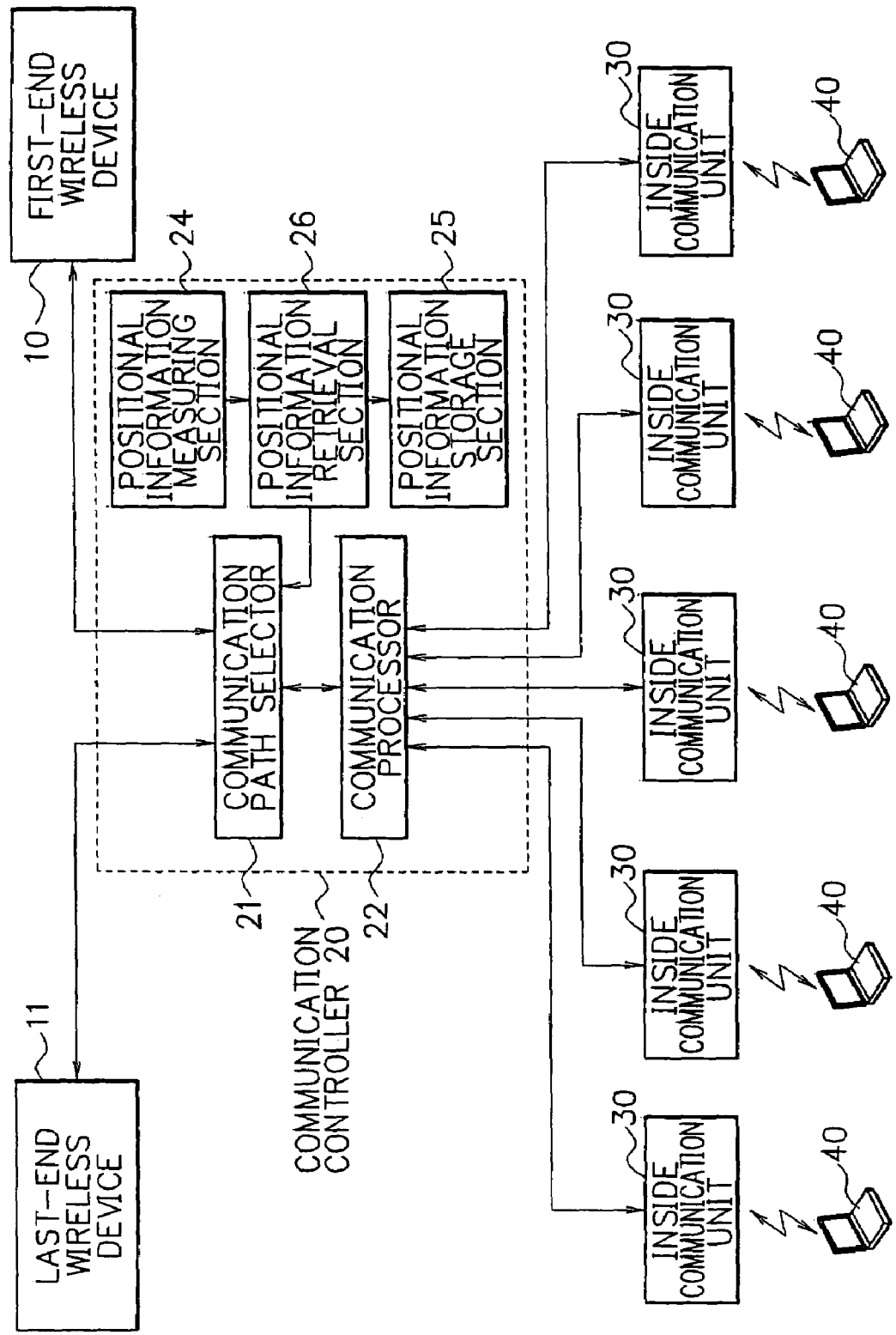
FIG. 8 is a schematic diagram showing a configuration of a third embodiment of the mobile communication system.

As can be seen from FIG. 8, the third embodiment is implemented by additionally disposing in the first embodiment a positional information measuring section 24 to measure a present position (a central position) of the mobile unit 2 in a moving state thereof, a positional information storing section 25 to store installation positions of fixed radio base stations 1-1 to 1-N (N is an integer more than one), and a positional information retrieving section 26 to retrieve the installation position of one of the base stations 1-1 to 1-N nearest to the mobile unit 2. In the configuration of the mobile communication system, to establish the linked state between the mobile unit 2 and the base station determined to be nearest to the unit 2 by the retrieving section 26, the connection between the first-end radio device 10 and the communication processor 22 or that between the last-end radio device 11 and the processor 22 is selectively changed. Description will now be given of functions as aspects of the third embodiment.

The positional information measuring section 24 obtains a current position of the mobile unit 2 using the global positioning system (GPS). The section 24 is favorably placed at a central position of the unit 2 to measure the position thereof. This increases precision of the position thus measured.

The positional information storage 25 beforehand stores installation positions of the fixed radio base stations 1-1 to 1-N installed along a line on which the mobile unit 2 travels.

The positional information retrieval section 26 carries out a retrieval through the storage 25 according to the positional information of the mobile unit 2 obtained by the measuring section 24 to resultantly attain an installation position of one of the base stations most associated with the positional information. The section 26 delivers the installation position of the base station to the path selector 21. Using the installation position from the retrieval section 26, the selector 21 conducts a change-over operation to set a linked state or a link between the mobile unit 2 and the base station at the installation position.

When the selector 21 determines that the installation position of the base station is in a forward position of the mobile unit 2, the first-end radio module 10 is nearest to the base station. Therefore, the selector 21 carries out a change-over operation to connect the radio module 10 linked with the base station to the communication processor 22. When the selector 21 determines that the installation position of the base station is in a backward position of the mobile unit 2, it is assumed that the last-end radio module 11 is nearest to the base station. In consequence, the selector 21 accomplishes a switching operation to couple the radio module 11 linked with the base station to the communication processor 22.

According to the positional information obtained by the measuring section 24, the installation position of the base station nearest to the current position of the mobile unit 2 is attained. It is therefore possible that the connection between the module 10 and the processor 22 or that between the module 11 and the processor 22 can be selected by the switching operation to thereby establish a linked state between the mobile unit 2 and the base station nearest to the present position of the unit 2. Consequently, the mobile radio device 40 in the mobile unit 2 can communicate data with the base station via the inside communication unit 30 in the train coupled with the first-end or last-end radio module 10 or 11 in a more favorable communication state.

Fourth Embodiment

Description will next be given of a fourth embodiment of a mobile communication system in accordance with the present invention.

Figure 9:
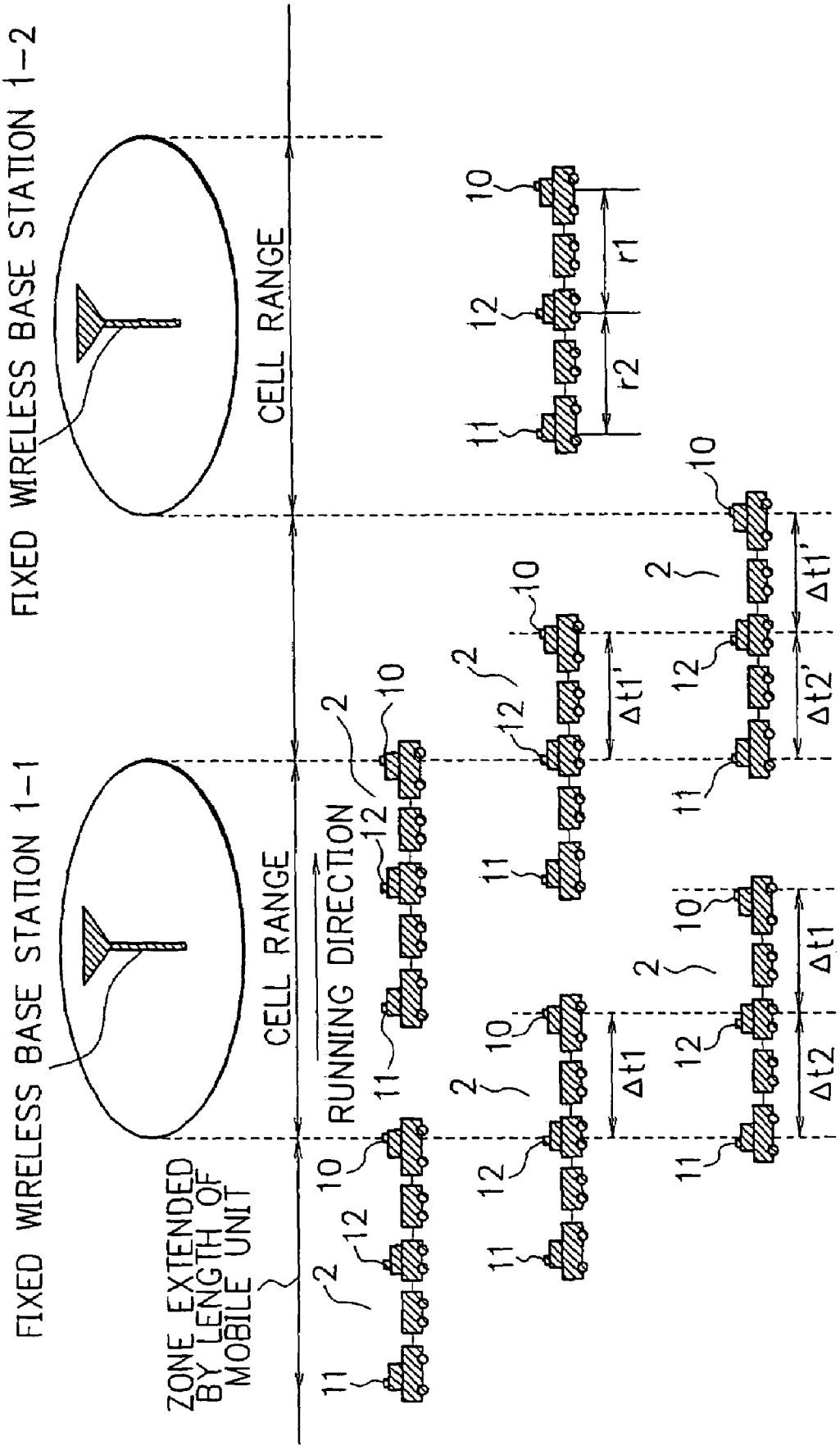
FIG. 9 is a diagram schematically showing a configuration of a mobile unit in a fourth embodiment and operation of the unit in which a wireless device is additionally disposed at a central position of the mobile unit.
Figure 10:
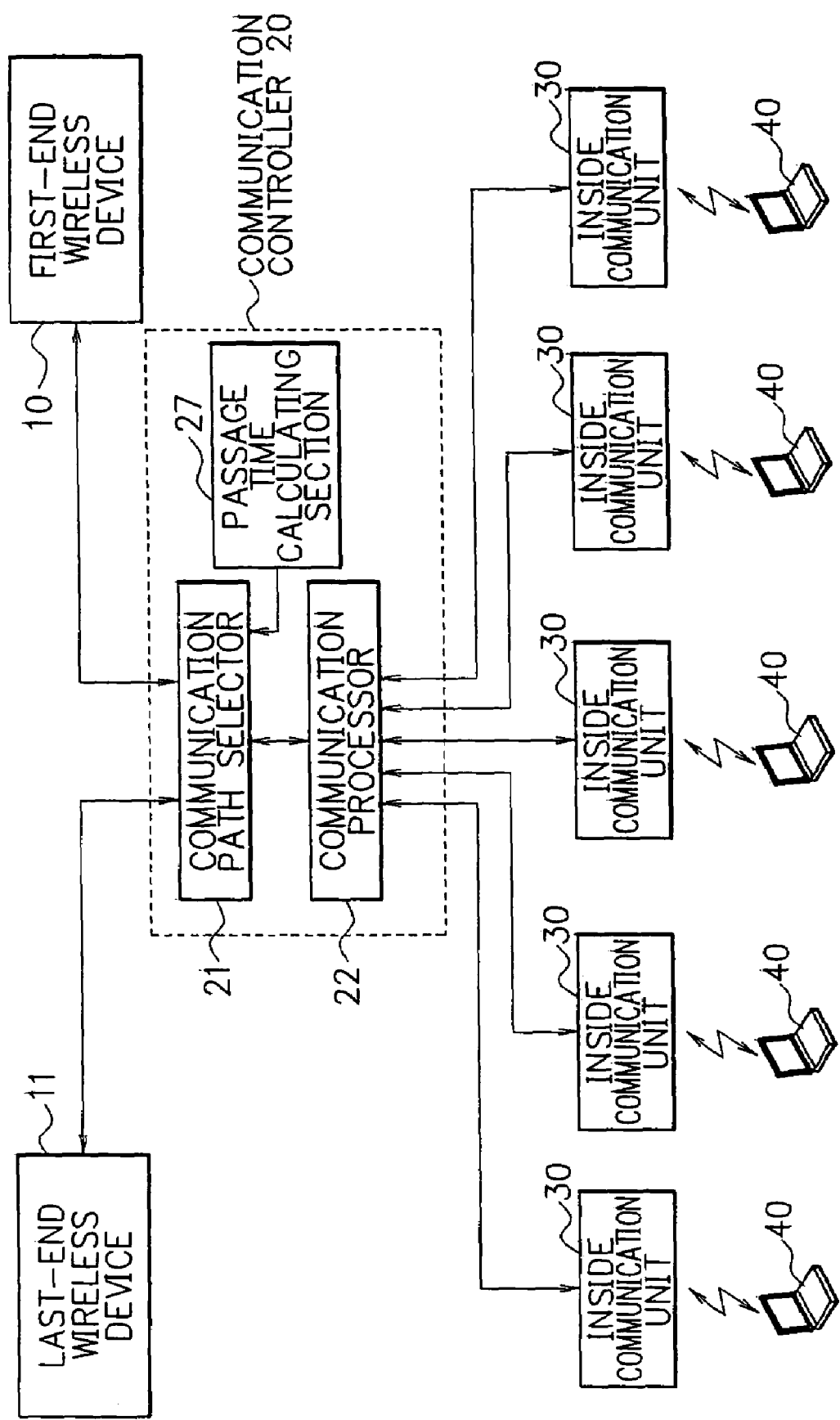
FIG. 10 is a diagram showing a construction of a fourth embodiment of the mobile communication system.

The fourth embodiment of a mobile communication system includes a radio device (a central radio device) 12 at a central position of the mobile unit 2 as shown in FIG. 9. In the configuration, a point of time when the first-end radio device 10 on the mobile unit 2 enters a cell formed by a fixed radio base station and a point of time when the device 10 leaves the cell of the base station as well as a point of time when the central radio device 12 on the unit 2 enters the cell of the radio base station and a point of time when the device 12 leaves the cell of the base station are obtained. According to respective intervals of time ($\Delta t1$, $\Delta t1'$) between the devices 10 and 12, the system predicts a point of time ($\Delta t2$) when the last-end radio device 11 on the unit 2 enters the cell of the radio base station and a point of time ($\Delta t2'$) when the device 11 leaves the cell. Using the predicted time values, the system selectively conducts a change-over operation between the connection between the first-end radio device 10 and the communication processor 22 and that between the last-end radio device 11 and the processor 22. Referring now to FIG. 10, description will be given of the construction of the fourth embodiment.

In the mobile communication system of the fourth embodiment, the communication controller 20 includes a passage time calculating section 27. The calculating section 27 first acquires the time value when the first-end radio device 10 enters a cell of a base station and the time value when the device 10 leaves the cell and the time value when the central radio device 12 enters the cell and the time value when the device 12 leaves the cell. Using the time values, the section 27 obtains passage time values ($\Delta t1$, $\Delta t1'$) for the radio devices 10 and 12. According to the passage time values, the section 27 calculates a point of time ($\Delta t2$) when the last-end radio device 11 enters the cell and a point of time ($\Delta t2'$) when the device 11 leaves the cell. Based on the time value ($\Delta t2$) from when the central radio device 12 enters the cell and when the device 12 leaves the cell, the calculating section 27 issues a switching request to the path selector 21 to accomplish a switching operation between the connection between the first-end radio device 10 and the communication processor 22 and that between the last-end radio device 11 and the processor 22. According to the time value ($\Delta t2'$) from when the central radio device 12 leaves the cell and when the last-end device 11 leaves the cell, the calculating section 27 sends a change-over request to the path selector 21 to carry out a change-over operation between the connection between the last-end radio device 11 and the processor 22 and that between the first-end radio device 10 and the processor 22.

Since the device 12 is at the central position between the devices 10 and 11, the distance r1 between the devices 10 and 12 is substantially equal to that r2 between the devices 12 and 11, namely, r1=r2. Assume that the mobile unit 2 travels at a fixed speed. Then, a period of time ($\Delta t1$) from when the device 10 enters a cell to when the device 12 enters the cell is almost equal to a period of time ($\Delta t2$) from when the device 12 enters the cell to when the device 11 enters the cell. The system can therefore assume $\Delta t2 = \Delta t1$. Similarly, a period of time ($\Delta t2'$) from when the device 12 leaves the cell to when the device 11 leaves the cell is substantially equal to a period of time ($\Delta t1'$) from when the device 10 leaves the cell to when the device 12 leaves the cell. Therefore, system can assume $\Delta t2' = \Delta t1'$. In the description, the switching operation is carried out between the connection between the first-end radio device 10 and the communication processor 22 and that between the last-end radio device 11 and the processor 22. However, it is also possible to add thereto the connection between the central radio device 12 and the communication processor 22. In this case, the linked state are changed over between three radio devices 10 to 12.

Fifth Embodiment

Description will now be given of a fourth embodiment in accordance with the present invention.

Figure 11:
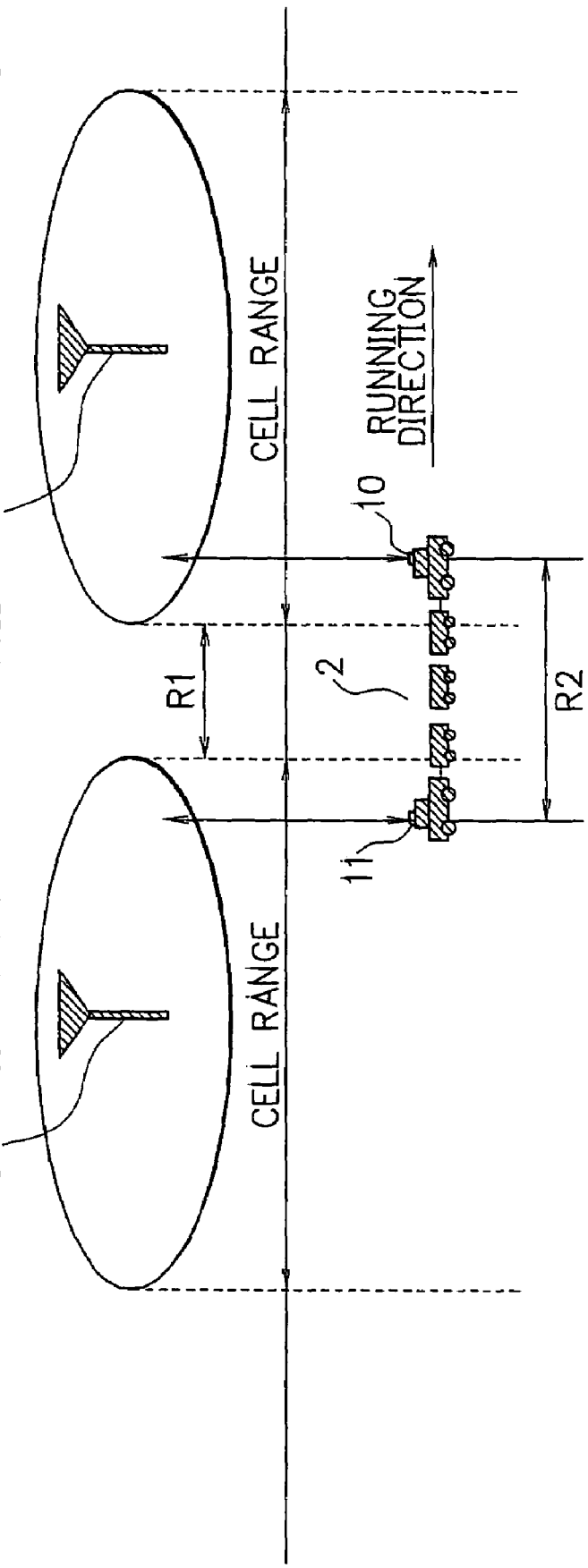
FIG. 11 is a diagram schematically showing a state in which a mobile unit in a fifth embodiment established a link with two fixed wireless base stations (1-1 and 1-2) disposed at separated positions.
Figure 12:
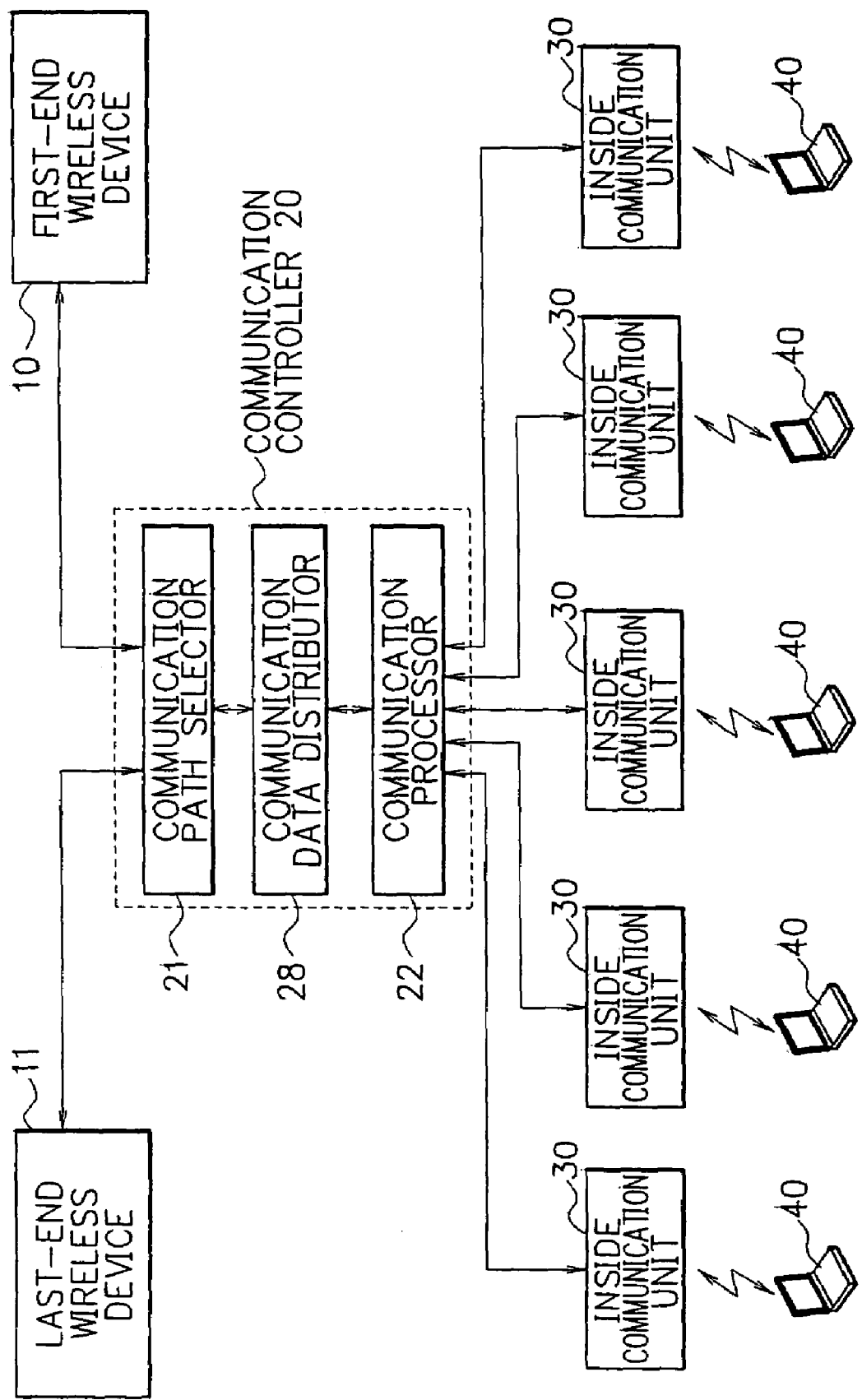
FIG. 12 is a block diagram showing a configuration of a fifth embodiment of the mobile communication system.

As can be seen from FIG. 11, when a linked state is set with respect to two fixed radio base stations 1-1 and 1-2 separated from each other in the fifth embodiment of a mobile communication system, it is possible to retain bands of the base stations 1-1 and 1-2 by keeping the linked state for the base stations 1-1 and 1-2. Referring next to FIG. 12, description will be given of operation of the fifth embodiment.

Figure 13:
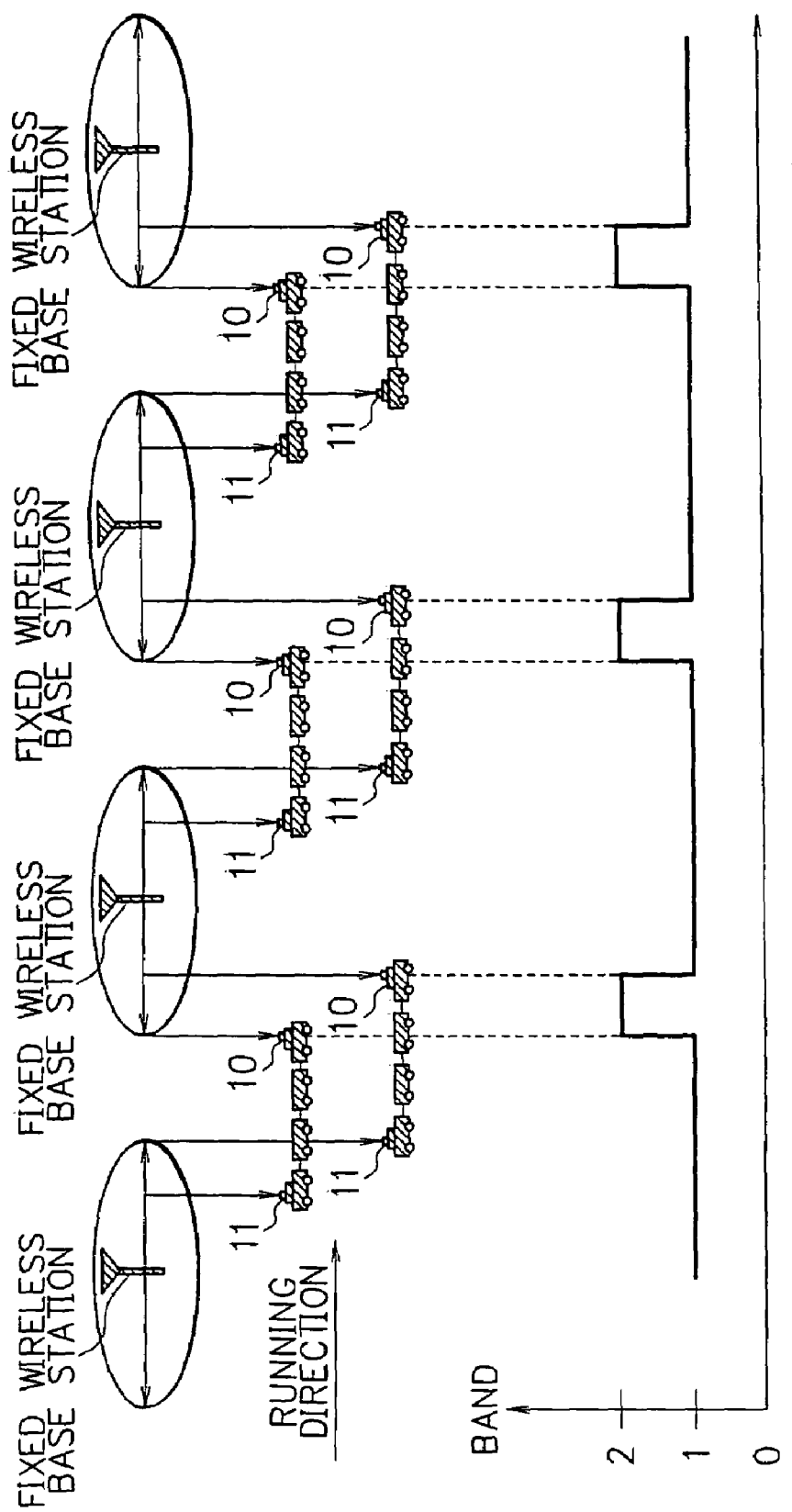
FIG. 13 is a schematic diagram showing a band change of a mobile unit in the fifth embodiment.

In the embodiment, for example, when the last-end radio device 11 belongs to the first base station 1-1 and the first-end radio device 10 belongs to the second base station 1-2 as shown in FIG. 11, the path selector 21 of the communication controller 20 shown in FIG. 12 selectively establishes connection between the device 11 and the communication processor 22 and connection between the device 10 and the processor 22. It is therefore possible to set a communication network between each of the radio devices 10 and 11 and the base stations respectively associated therewith. As can be seen from FIG. 13, when the devices 10 and 11 on the mobile unit 2 belong respectively to different base stations, the mobile unit 2 can occupy a band which is twice as wide as an ordinary band. FIG. 13 includes a graph in its lower section showing a band change in the first-end position (the position of the first-end radio device 10) of the mobile unit 2.

In the fifth embodiment, the connection between the radio device 11 and the path selector 21 and that between radio device 10 and the selector 21 are both established. In consequence, the communication controller 20 includes a communication data distributor 28 to determine the radio device 10 or 11 as the destination of data. The distributor 28 indicates the path selector 21 to send a data packet to the device 10 or 11 determined as the destination of data. According to the indication from the distributor 28, the path selecting section 21 selects a communication path to the radio device 10 or 11 to deliver a data packet thereto.

Figure 14:
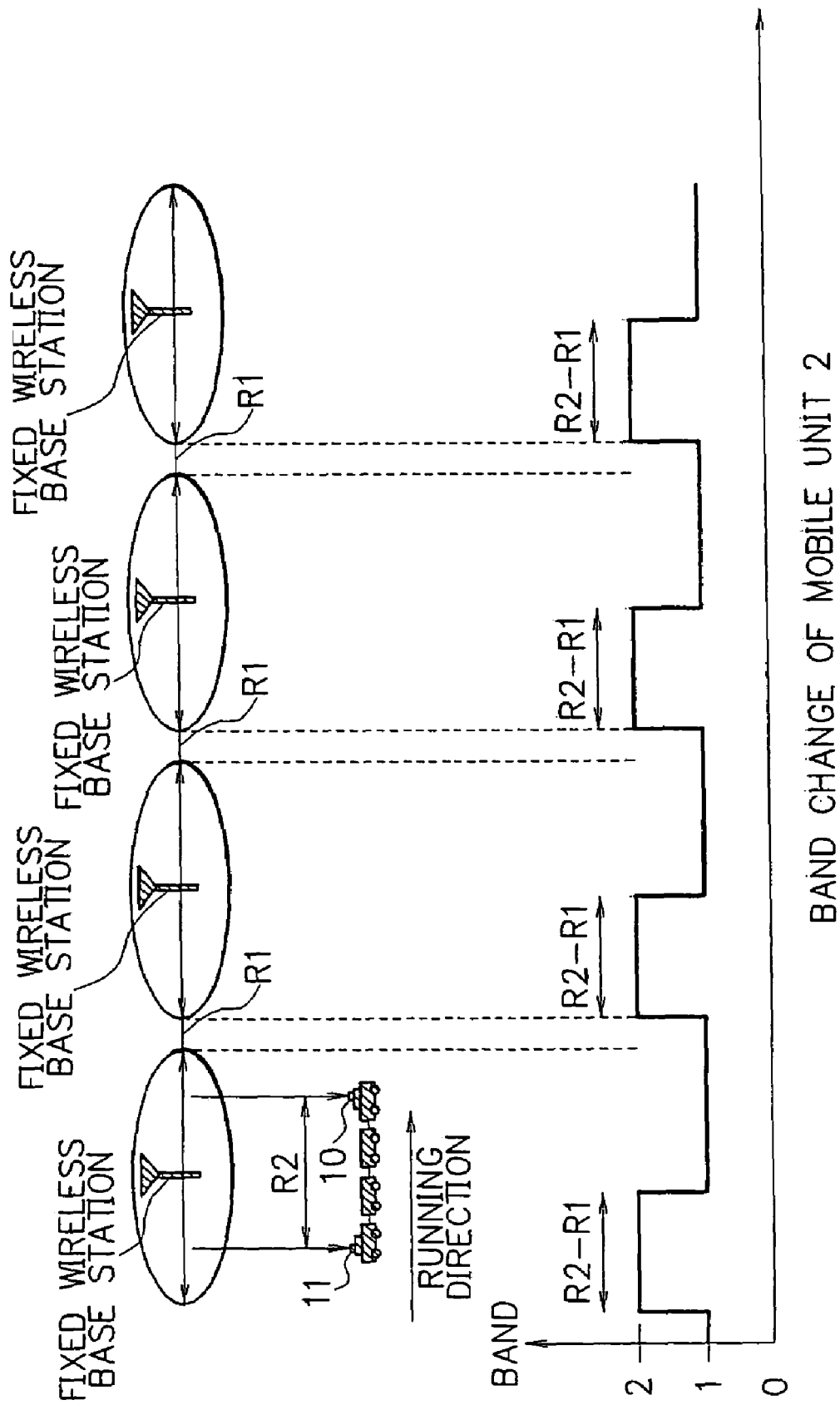
FIG. 14 is a diagram illustratively showing a band change of a mobile unit when the fixed wireless base stations are less apart from each other.
Figure 15:
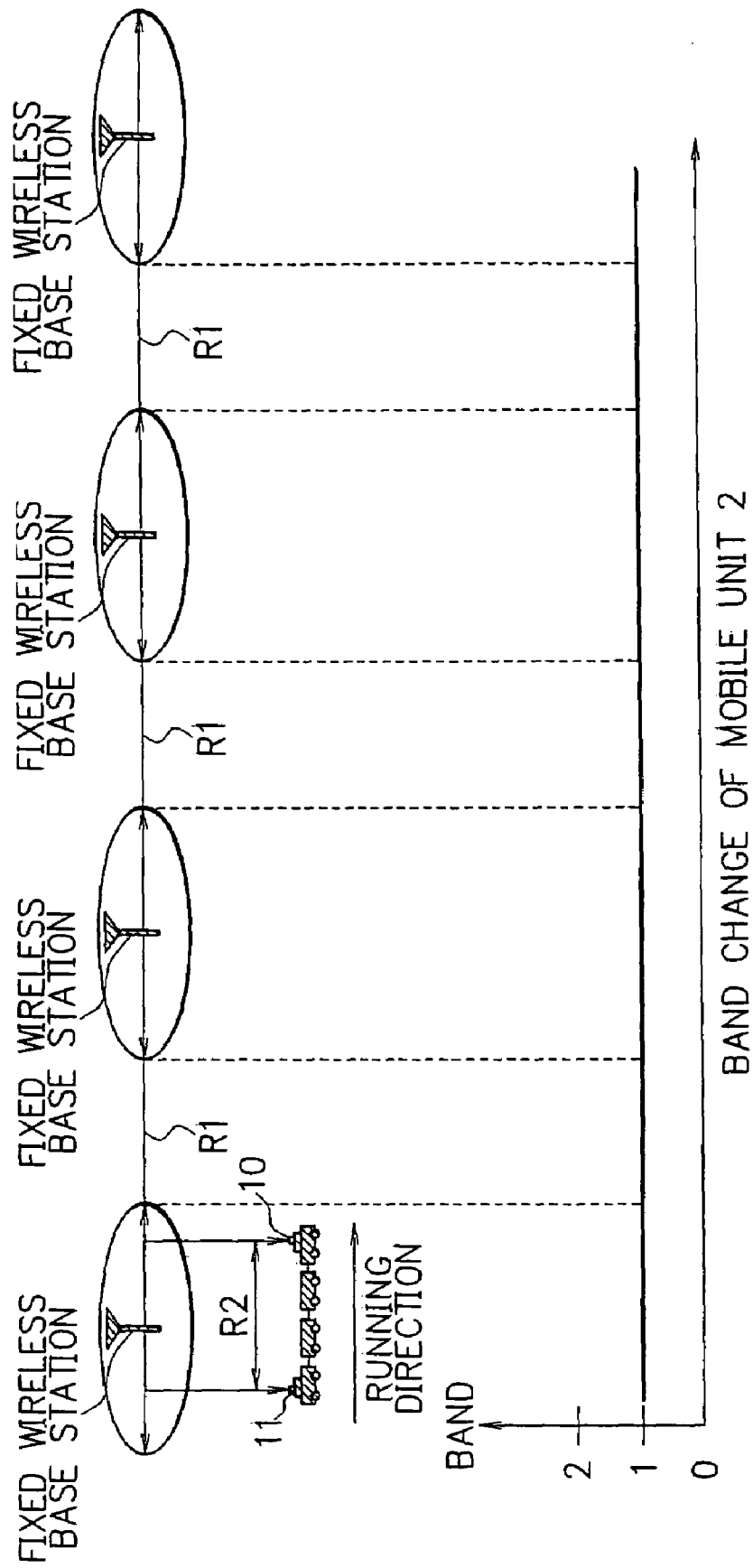
FIG. 15 is a schematic diagram showing a band change of a mobile unit when the distance between the fixed wireless base stations is elongated.
Figure 17:
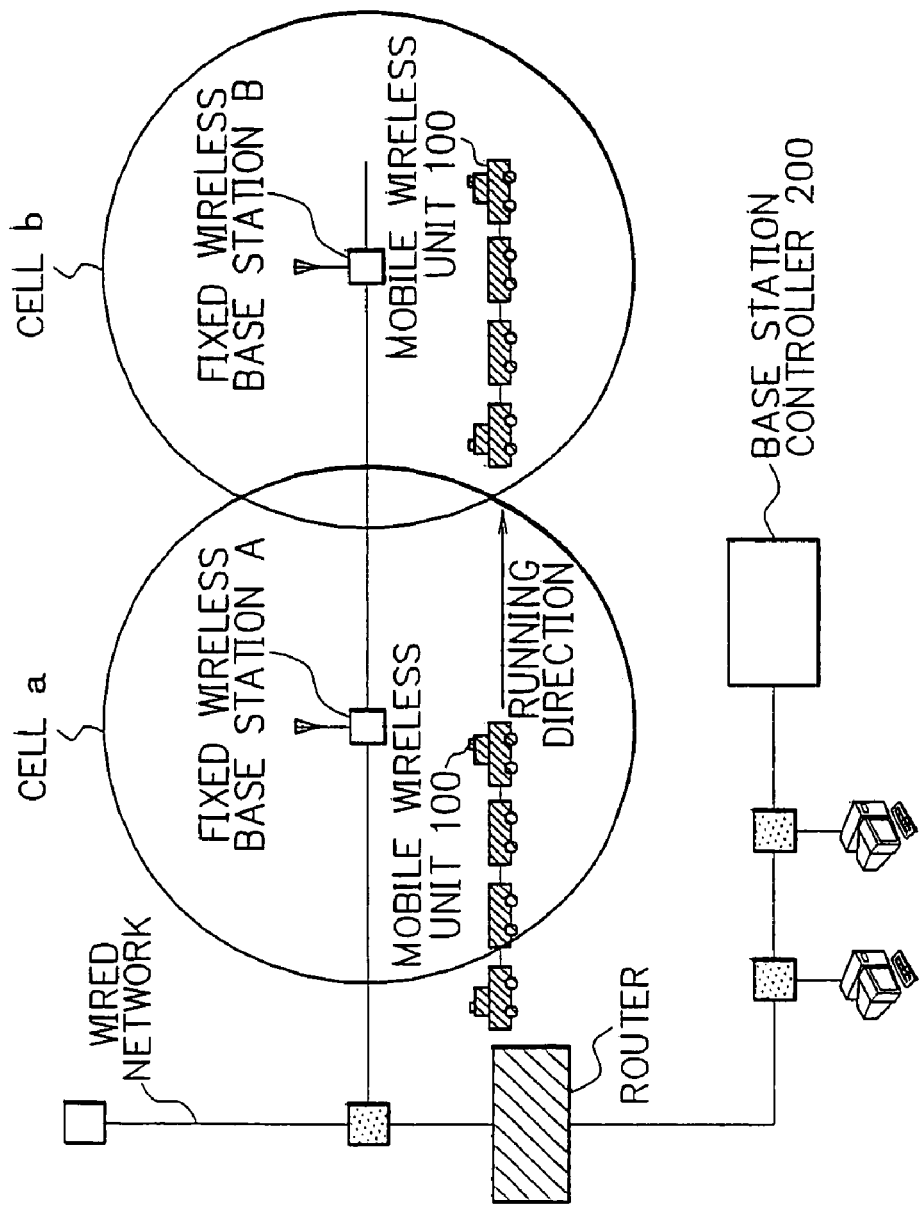
FIG. 17 is a diagram schematically showing an example of processing of a wireless device on a mobile unit in a mobile communication system of the prior art in which cells formed by fixed wireless base stations overlap with each other.
Figure 18:
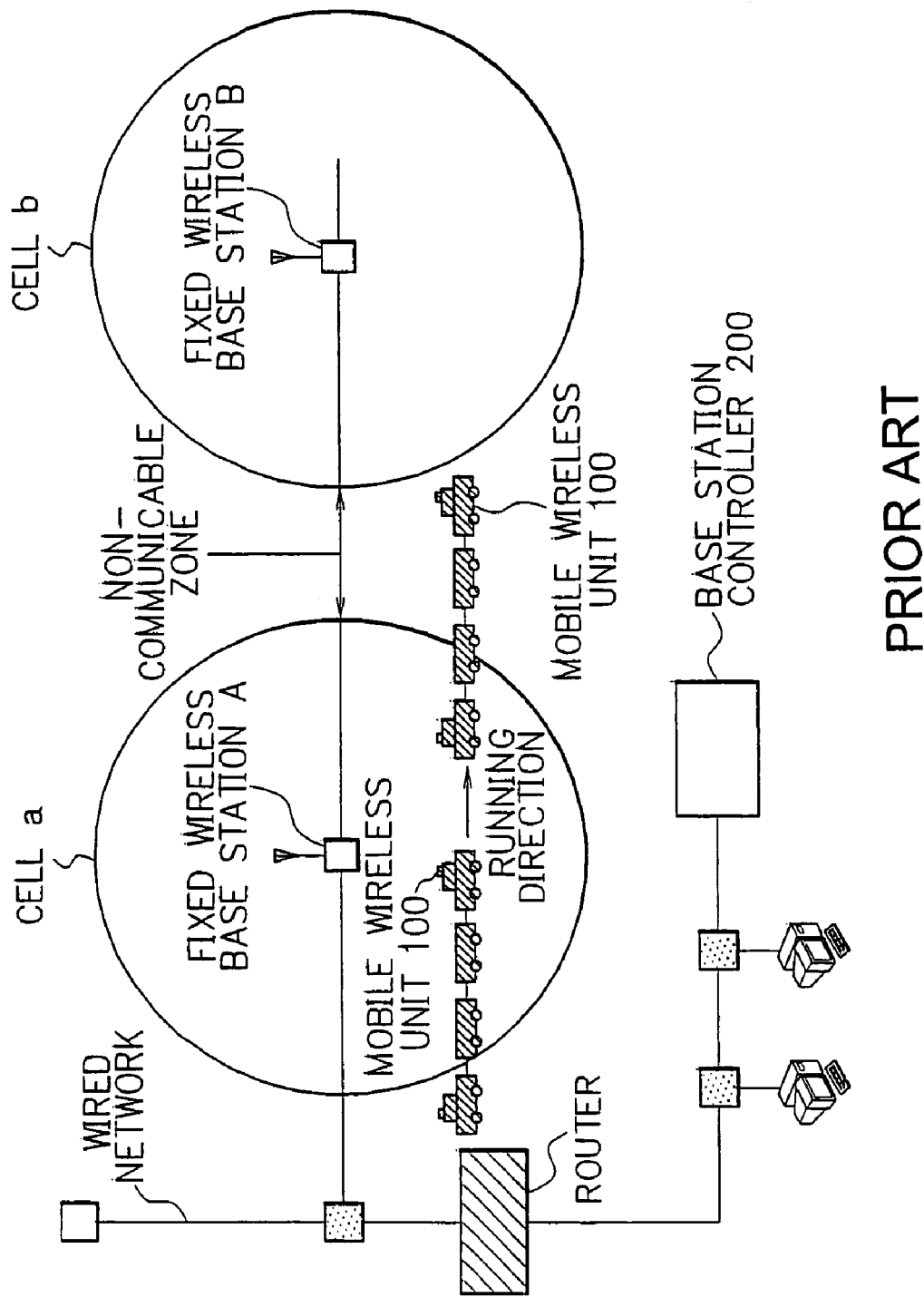
FIG. 18 is a schematic diagram showing operation of a wireless device mounted on a mobile unit in a prior-art mobile communication system in which a cell is thinned out from the cells of fixed wireless base stations.

As can be seen from FIG. 11, by elongating the distance R2 between the radio devices 10 and 11 on the mobile unit 2 and/or by reducing the distance between the cell of the base station 1-1 and that of the base station 1-2, the mobile communication system of the fifth embodiment can increase the period of time in which the linked state is kept established for the radio devices 10 and 11. For example, as shown in FIG. 14, when the interval between the installation positions of the base stations is reduced, the distance R1 between the cells of the base stations becomes shorter. Resultantly, the period of time in which the linked state is kept established for the radio devices 10 and 11 is elongated. In the mobile unit 2, the linked state for the devices 10 and 11 is kept retained for a band zone expressed as R2−R1. When the interval R1 between the cells of the base stations is substantially equal to the distance R2 between the radio devices 10 and 11 on the mobile unit 2, the range in which the devices 10 and 11 belong respectively to two base stations disappears, i.e., R2−R1=0 as shown in FIG. 15. Therefore, the mobile unit 2 can use only one radio band.

Description has been given of only favorable embodiments in accordance with the present invention. Various changes and modifications are possible within the scope and spirit of the present invention. For example, the networks established in the mobile unit 2 in the embodiments of the mobile communication system are not limitative. That is, wired and wireless networks can also be used. The network in the mobile unit 2 may be configured as a combination of wireless and wired communication paths.

In accordance with the present invention, there can be provided advantages as below.

In the mobile communication system and the communication control method in accordance with the present invention, a first-end radio device mounted in a first-end section of a mobile unit and linked with a fixed radio base station or a last-end radio device mounted in a last-end section of the mobile unit and linked with a fixed radio base station is selected. The radio device thus selected is connected to a plurality of mobile terminals in the mobile unit to construct a communication network. Therefore, even when cells formed by the base stations are apart from each other, communication can be continuously carried out by readily conducting a switching operation between the cells. It is consequently possible to reduce the number of fixed radio base stations installed in the system.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile communication system, comprising:
a plurality of fixed radio base stations each of which configures a predetermined wave arrival range and establishes a linked state with a radio device within the wave arrival range to conduct radio communication with the radio device; and
a mobile unit with at least two modules of the radio devices mounted at positions of the mobile unit to be in a wave arrival range of any one of the base stations, the unit including communication controller for controlling the radio devices on the mobile unit, wherein:
the base stations are disposed at positions at which the base stations form wave arrival ranges not overlapping with each other;
the communication controller includes a radio device connecter for establishing a communication network between a plurality of mobile terminals in the mobile unit and at least one radio device selected from a first-end radio device mounted in a first-end section of the mobile unit is linked in a linked state with one of the base stations and a last-end radio device mounted in a last-end section of the mobile unit is linked in a linked state with one of the base stations; and
the radio device connecter establishes a communication network between the first-end radio device and the mobile terminals at occurrence of an event in which once the linked state of the first-end radio device with a first fixed radio base station is released and then a linked state of the first-end radio device with a second fixed radio base station is established, and
establishes a communication network between the last-end radio device and the mobile terminals at occurrence of an event in which once the linked state of the last-end radio device with the first fixed radio base station is released and then a linked state of the last-end radio device with the second fixed radio base station is established.

2. A mobile communication system in accordance with claim 1, wherein:
the communication controller includes a radio wave controller for comparing a value of a radio wave level received by the first-end radio device from the base station associated therewith with a value of a radio wave level received by the last-end radio device from the base station associated therewith; and
the radio device connecter establishes a communication network between the mobile terminals in the mobile unit and one of the radio devices having a higher value of the radio wave level determined as a result of the comparison by the radio wave controller.

3. A mobile communication system in accordance with claim 2, wherein the radio wave controller compares, when a radio wave received by the first-end radio device from the base station associated therewith is transmitted from the first-end radio device or when a radio wave received by the last-end radio device from the base station associated therewith is transmitted from the last-end radio device, values of radio wave levels of the radio waves with each other, and establishes a communication network between the mobile terminals in the mobile unit and one of the radio devices having a higher value of the radio wave level determined as a result of the comparison by the radio wave controller.

4. A mobile communication system in accordance with claim 2, wherein:
the first-end radio device measures therein a value of a level of a radio wave received by the first-end radio device from the base station associated therewith;
the last-end radio device measures therein a value of a level of a radio wave received by the last-end radio device from the base station associated therewith; and
the radio wave controller compares, when the values resultant from measurement by the respective radio devices are transmitted therefrom, the values with each other and then establishes a communication network between the mobile terminals in the mobile unit and one of the radio devices having a higher value of the radio wave level determined as a result of the comparison by the radio wave controller.

5. A mobile communication system in accordance with claim 1, wherein:
the communication controller includes:
a positional information measuring part for measuring a central position of the mobile unit while the mobile unit is moving;
a positional information storage storing installation positions respectively of the fixed radio base stations; and
a positional information retrieval part for retrieving from the positional information storage an installation position of one of the base stations according to the central position of the mobile unit measured by the positional information measuring part, the installation position being most associated with the central position; and
the radio device connecter establishes a communication network between the first-end radio device and the mobile terminals when it is determined that the installation position of the base station retrieved by the positional information retrieval part is at a forward position of the mobile unit, and
establishes a communication network between the last-end radio device and the mobile terminals when it is determined that the installation position of the base station retrieved by the positional information retrieval part is at a backward position of the mobile unit.

6. A mobile communication system in accordance with claim 1, wherein:
the communication controller includes a passage time calculating part for obtaining a period of incoming time from when the first-end radio device enters a radio wave arrival range formed by the base station associated therewith to when a central radio device disposed at a central position of the mobile unit enters the radio wave arrival range and a period of outgoing time from when the first-end radio device leaves the radio wave arrival range formed by the base station to when the central radio device leaves the radio wave arrival range; and
the radio device connecter establishes a communication network between the last-end radio device and the mobile terminals by predicting, on the basis of the period of incoming time obtained by the passage time calculating part, a period of time from when the central radio device enters the radio wave arrival range to when the last-end radio device enters the radio wave arrival range, and establishes a communication network between the first-end radio device and the mobile terminals by predicting, on the basis of the period of outgoing time obtained by the passage time calculating part, a period of time from when the central radio device leaves the radio wave arrival range to when the last-end radio device leaves the radio wave arrival range.

7. A mobile communication system in accordance with claim 1, wherein the radio device connecter establishes a communication network between the last-end radio device and the mobile terminals and a communication network between the first-end radio device and the mobile terminals when the last-end radio device is in the linked state with the first base station and the last-end radio device is in the linked state with the second base station.

8. A mobile communication system in accordance with claim 7, wherein the communication controller includes communication data distributor for making, when the radio device connecter establishes a communication network between the last-end radio device and the mobile terminals and a communication network between the first-end radio device and the mobile terminals, a check to determine whether data is transmitted to the first-end radio device or the last-end radio device and sends a data packet to the first-end or last-end radio device determined as a result of the check.

9. A communication control method for use with a mobile communication system comprising a plurality of fixed radio base stations each of which configures a predetermined wave arrival range and establishes a linked state with a radio device within the wave arrival range to conduct radio communication with the radio device and a mobile unit with at least two modules of the radio devices mounted at positions of the mobile unit to be in a wave arrival range of any one of the base stations, the unit including communication controller for controlling the radio devices on the mobile unit, the communication controller including radio device connecter for establishing a communication network between a plurality of mobile terminals in the mobile unit and at least one radio device selected from a first-end radio device mounted in a first-end section of the mobile unit is linked in a linked state with one of the base stations and a last-end radio device mounted in a last-end section of the mobile unit is linked in a linked state with one of the base stations, the method comprising the steps of:
selecting by the radio device connecter, when the radio device connecter senses occurrence of an event in which once the linked state of the first-end radio device with a first fixed radio base station is released and then a linked state of the first-end radio device with a second fixed radio base station is established, the first-end radio device and establishing a communication network between the first-end radio device and the mobile terminals; and
selecting by the radio device connecter, when the radio device connecter senses occurrence of an event in which once the linked state of the last-end radio device with the first fixed radio base station is released and then a linked state of the last-end radio device with the second fixed radio base station is established, the last-end radio device and establishing a communication network between the last-end radio device and the mobile terminals.

10. A communication control method in accordance with claim 9, the communication controller further including radio wave controller for comparing a value of a radio wave level received by the first-end radio device from the base station associated therewith with a value of a radio wave level received by the last-end radio device from the base station associated therewith, the method further comprising the steps of:

comparing by the radio wave controller a value of a radio wave level received by the first-end radio device from the base station associated therewith with a value of a radio wave level received by the last-end radio device from the base station associated therewith; and establishing by the radio device connecter a communication network between the mobile terminals in the mobile unit and one of the radio devices having a higher value of the radio wave level determined as a result of the comparison by the radio wave controller.

11. A communication control method in accordance with claim 10, further comprising the steps of:

comparing by the radio wave controller, when a radio wave received by the first-end radio device from the base station associated therewith is transmitted from the first-end radio device or when a radio wave received by the last-end radio device from the base station associated therewith is transmitted from the last-end radio device, values of radio wave levels of the radio waves with each other; and establishing by the radio device connecter a communication network between the mobile terminals in the mobile unit and one of the radio devices having a higher value of the radio wave level determined as a result of the comparison by the radio wave controller.

12. A communication control method in accordance with claim 10, further comprising the steps of:

measuring by the first-end radio device a value of a level of a radio wave received from the base station associated therewith and transmitting the value to the radio wave controller;

measuring by the last-end radio device a value of a level of a radio wave received from the base station associated therewith and transmitting the value to the radio wave controller;

comparing by the radio wave controller, when the values resultant from measurement by the respective radio devices are transmitted therefrom, the values with each other; and establishing the radio device connecter a communication network between the mobile terminals in the mobile unit and one of the radio devices having a higher value of the radio wave level determined as a result of the comparison by the radio wave controller.

13. A communication control method in accordance with claim 9, the communication controller further including a positional information measuring part measuring a central position of the mobile unit while the mobile unit is moving, a positional information storage storing installation positions respectively of the fixed radio base stations, and a positional information retrieval part for retrieving from the positional information storage an installation position of one of the base stations according to the central position of the mobile unit measured by the positional information measuring part, the installation position being most associated with the central position, the method further comprising the steps of:

measuring by the positional information measuring part a central position of the mobile unit while the mobile unit is moving, and transmitting the central position to the positional information retrieval part;

retrieving, by the positional information retrieval part, from the positional information storage an installation position of one of the base stations according to the central position of the mobile unit measured by the positional information measuring part, the installation position being most associated with the central position, and delivering the installation position to the radio device connecter; and establishing by the radio device connecter a communication network between the first-end radio device and the mobile terminals when it is determined that the installation position of the base station retrieved by the positional information retrieval part is at a forward position of the mobile unit, and establishing a communication network between the last-end radio device and the mobile terminals when it is determined that the installation position of the base station retrieved by the positional information retrieval part is at a backward position of the mobile unit.

14. A communication control method in accordance with claim 9, the communication controller further including a passage time calculator for obtaining a period of incoming time from when the first-end radio device enters a radio wave arrival range formed by the base station associated therewith to when a central radio device disposed at a central position of the mobile unit enters the radio wave arrival range and a period of outgoing time from when the first-end radio device leaves the radio wave arrival range formed by the base station to when the central radio device leaves the radio wave arrival range, the method further comprising the steps of:

obtaining by the passage time calculator the period of incoming time from when the first-end radio device enters a radio wave arrival range formed by the base station associated therewith to when a central radio device disposed at a central position of the mobile unit enters the radio wave arrival range, and transmitting the period of incoming time to the radio device connecter;

establishing by the radio device connecter a communication network between the last-end radio device and the mobile terminals by predicting, on the basis of the period of incoming time obtained by the passage time calculator, a period of time from when the central radio device enters the radio wave arrival range to when the last-end radio device enters the radio wave arrival range;

obtaining by the passage time calculator the period of outgoing time from when the first-end radio device leaves the radio wave arrival range formed by the base station to when the central radio device leaves the radio wave arrival range, and transmitting the period of outgoing time to the radio device connecter; and establishing by the radio device connecter a communication network between the first-end radio device and the mobile terminals by predicting, on the basis of the period of outgoing time obtained by the passage time calculator, a period of time from when the central radio device leaves the radio wave arrival range to when the last-end radio device leaves the radio wave arrival range.

15. A communication control method in accordance with claim 9, further comprising the step of establishing by the radio device connecter a communication network between the last-end radio device and the mobile terminals and a communication network between the first-end radio device and the mobile terminals when the last-end radio device is in the linked state with the first base station and the last-end radio device is in the linked state with the second base station.

16. A communication control method in accordance with claim 15, the communication controller further including a communication data distributor for making a check to determine whether data is transmitted to the first-end radio device or the last-end radio device and sends a data packet to the first-end or last-end radio device determined as a result of the check, the method further comprising the steps of making a check by the communication data distributor, when the radio device connecter establishes a communication network between the last-end radio device and the mobile terminals and a communication network between the first-end radio device and the mobile terminals, to determine whether data is transmitted to the first-end radio device or the last-end radio device and sending a data packet to the first-end or last-end radio device determined as a result of the check.

\* \* \* \* \*